US011663684B2

(12) United States Patent
Hailey et al.

(10) Patent No.: US 11,663,684 B2
(45) Date of Patent: *May 30, 2023

(54) SYSTEMS AND METHODS FOR IDENTIFYING ANCILLARY HOME COSTS

(71) Applicant: State Farm Mutual Automobile Insurance Company, Bloomington, IL (US)

(72) Inventors: John Ryan Hailey, Bloomington, IL (US); John Andrew Schirano, Bloomington, IL (US); Erin Ann Olander, Bloomington, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 63 days.

This patent is subject to a terminal disclaimer.

(21) Appl. No.: 17/478,568

(22) Filed: Sep. 17, 2021

(65) Prior Publication Data
US 2022/0005134 A1 Jan. 6, 2022

Related U.S. Application Data

(63) Continuation of application No. 15/815,029, filed on Nov. 16, 2017, now Pat. No. 11,151,669.

(51) Int. Cl.
*G06Q 50/16* (2012.01)
*G06Q 30/02* (2023.01)
(Continued)

(52) U.S. Cl.
CPC ............ *G06Q 50/16* (2013.01); *G06F 3/048* (2013.01); *G06Q 30/0283* (2013.01); *G06Q 40/025* (2013.01); *G06Q 40/08* (2013.01)

(58) Field of Classification Search
CPC .. G06Q 50/16; G06Q 30/0283; G06Q 40/025; G06Q 40/08; G06F 3/048
See application file for complete search history.

(56) References Cited

U.S. PATENT DOCUMENTS 5,189,606 A 2/1993 Burns et al.
8,341,089 B2 12/2012 Fassio et al.
(Continued)

FOREIGN PATENT DOCUMENTS

CA 2832330 A1 5/2014

OTHER PUBLICATIONS

M. Wich and T. Kramer, "Enrichment of Smart Home Services by Integrating Social Network Services and Big Data Analytics," 2016 49th Hawaii International Conference on System Sciences (HICSS), 2016, pp. 425-434, doi: 10.1109/HICSS.2016.59. (Year: 2016).*

(Continued)

*Primary Examiner* — Sarah M Monfeldt
*Assistant Examiner* — Wenren Chen
(74) *Attorney, Agent, or Firm* — Armstrong Teasdale LLP

(57) ABSTRACT

A home cost analysis server is configured to train an image processing program to identify features of homes, receive user input including a prospective home, and access a first database storing metadata and images associated with homes, including the prospective home, available for purchase. The server is also configured to input images of the prospective home to the machine-learned image processing program, which outputs a feature of the prospective home, access a second database storing historical ancillary costs, and perform a lookup in the second database to retrieve comparable historical ancillary costs associated homes having a comparable feature to the outputted feature. The server is further configured to analyze the metadata associated with the prospective home, the outputted feature, and the com- (Continued)

parable historical ancillary costs to determine ancillary home costs associated with the prospective home, and display the ancillary home costs and an overall monthly cost for the prospective home.

20 Claims, 11 Drawing Sheets

(51) Int. Cl.
*G06F 3/048* (2013.01)
*G06Q 40/08* (2012.01)
*G06Q 40/02* (2023.01)
*G06Q 30/0283* (2023.01)

(56) References Cited

U.S. PATENT DOCUMENTS

| | | |
|---|---|---|
| 8,473,372 B2 | 6/2013 | Callow et al. |
| 8,732,219 B1 | 5/2014 | Ferries et al. |
| 9,911,042 B1 | 3/2018 | Cardona et al. |
| 10,453,146 B1 | 10/2019 | Stricker et al. |
| 2007/0100775 A1 | 5/2007 | Vyas |
| 2007/0244777 A1 | 10/2007 | Torre et al. |
| 2008/0015890 A1 | 1/2008 | Malyala |
| 2010/0145827 A1 | 6/2010 | Callow et al. |
| 2011/0010278 A1 | 1/2011 | Bulman et al. |
| 2011/0218934 A1 | 9/2011 | Elser |
| 2012/0197685 A1 | 8/2012 | Mays et al. |
| 2012/0265633 A1 | 10/2012 | Wohlstadter et al. |
| 2013/0117072 A1 | 5/2013 | Nish |
| 2013/0198040 A1 | 8/2013 | Minard |
| 2013/0204773 A1 | 8/2013 | Wiese |
| 2014/0172479 A1 | 6/2014 | Gallagher et al. |
| 2014/0257864 A1 | 9/2014 | Billman |
| 2014/0280269 A1 | 9/2014 | Schultz et al. |
| 2014/0330753 A1 | 11/2014 | Nash et al. |
| 2014/0372020 A1 | 12/2014 | Stein |
| 2015/0242747 A1* | 8/2015 | Packes ................ G06N 3/0454 706/17 |
| 2015/0332355 A1 | 11/2015 | Kost et al. |
| 2016/0012510 A1* | 1/2016 | Binder .................... G06F 16/29 705/26.64 |
| 2016/0048934 A1* | 2/2016 | Gross .................. G06V 20/176 705/313 |
| 2016/0259995 A1 | 9/2016 | Ishii et al. |
| 2016/0335695 A1* | 11/2016 | Gokhale ............ G06Q 30/0627 |
| 2018/0137643 A1 | 5/2018 | Wang |

OTHER PUBLICATIONS

Bahr et al: "Maintenance Budgeting Methods", CIBW 70 International Conference in Facility Management Achieving Healthy and Creative Facilities, Edinburgh, Jun. 16-18, 2008.

Q. You, R. Pang, L. Cao and J. Luo, "Image-Based Appraisal of Real Estate Properties," in IEEE Transactions on Multimedia, vol. 19, No. 12, pp. 2751-2759, Dec. 2017, doi: 10.1109/TMM.2017. 2710804. (Year: 2017).

* cited by examiner

[Navigation tabs: Home Profile | Home Budget | Home Search | Home Scenarios | Home Center]

Budgeting

Monthly Living Expenses

Examples:
- Groceries, food and personal care items
- Transportation costs
- Clothing
- Entertainment
- Utilities
- Recreation costs
- Regular health care costs
- Other non-debt, non-tax, non-job related, non-savings and investment regularly recurring expenses

Learn More — 410

406 — $1,000

408 — [slider]

18% Percentage of Income

412 — [donut chart] $1,450 Targeted Monthly Home Payment — 414

1. ✓ Taxes
2. Living Expenses
3. Savings
4. Debt
5. Retirement
6. Other Expenses

Next

404

Home Ownership

When purchasing an existing home, you should budget approx. 1% to 3% of the purchase price annually for home maintenance and repairs. Some expenses that you should be prepared for:
- Appliances
- Heating and Cooling System
- Exterior Maintenance
- Garage door repair
- Roof repair/replacement A home warranty can help with some of the expense of unexpected repairs

Learn More

— 702

— 706

Home Profile | Home Budget | Home Search | Home Scenarios | Home Center

— 700

$1,469/month
incl. principal, interest, mortgage insurance (if appl.), property taxes & insurance (and HOA/condo dues if appl.)

ⓘ *Maint. & utility costs are est. $651/month. This expense is not incl. in above est. payment*

Sales Price: $254,900
4 beds • 4 Bath(s) • 4667 Sq. Ft
Large well maintained home in desirable subdivision. Close to park. Large formal living & dining rooms w/ hardwood floors. Spacious family room features hardwood floors...Read More >

Home Loan Options

30 year Fixed
*Rate: 3.975%/ APR 4.018%*
Principal and Interest Payment: $962.39
Loan Amount: $205,875

Term of Payments

( 30 )  ( 20 )  ( 15 )  ( 10 )

*Down payment: 20%*

[ Home Profile ] [ Home Budget ] [ Home Search ] [ Home Scenarios ] [ Home Center ] — 802

$1,469/month
Incl. principal, interest, mortgage insurance (if appl.), & property taxes & insurance (and HOA/condo dues if appl.)

⚠ *Maint. & utility costs are est. $651/month. This expense is not incl. in above est. payment*

Sales Price: $254,900
4 beds • 4 Bath(s) • 4667 Sq. Ft
Large well maintained home in desirable subdivision. Close to park. Large formal living & dining rooms w/ hardwood floors. Spacious family room features hardwood floors...Read More >

Ancillary Costs

|  | Annual | Monthly |
|---|---|---|
| REPEATING | | |
| ☐ Appliances | | |
| ☐ Utilities | | |
| ☑ 1% Maintenance Budget | $2,549 | $212 |
| ☑ Exterior Maintenance (Lawn + Snow) | $2,236 | $186 |
| HOME COSTS + ANCILLARY | | $1,867 |
| ONE-TIME | | |
| ☐ Lawn Mower ($400) | | |
| ☑ Snow Blower ($500) | | |

SYSTEMS AND METHODS FOR IDENTIFYING ANCILLARY HOME COSTS

CROSS-REFERENCE TO RELATED APPLICATIONS

This application is a continuation application of and claims priority to U.S. patent application Ser. No. 15/815,029, filed Nov. 16, 2017, which is incorporated herein by reference in its entirety.

FIELD OF THE INVENTION

The present disclosure relates to a system that (i) automates home searching for a prospective home buyer and organizes search results according to user-defined criteria and potential home maintenance costs; and (ii) leverages historical and statistical data to identify potential home maintenance costs that may be otherwise overlooked by or hidden from a prospective home buyer.

BACKGROUND

When a person, such as a prospective home buyer, is interested in purchasing a new home, the prospective home buyer may conduct their own searching for available homes, or may hire a real estate agent to assist in such a search. Most prospective home buyers search for a home within a target geographic location. In addition, most prospective home buyers search for a home within a particular price range. In some cases, the price range is broadly set according to an estimated monthly payment for the home, including typical costs such as a mortgage payment, property taxes, and/or home insurance.

However, there are many additional costs associated with homeownership. First-time homebuyers, as well as experienced homebuyers who may be searching for a very different type of home and/or in a different geographic area, may struggle to identify these additional costs. It would take extensive research and comparison of different homes within the geographic area, as well as considerable knowledge of upkeep and repair costs and timelines, in order for the prospective homebuyer to identify these additional costs. In many cases, precise and/or accurate repair data is unavailable to individuals. Even if most additional costs could be identified, which is unlikely, it would be unclear to most homebuyers how much additional costs will affect their budget and, accordingly, whether a particular home would be affordable. In addition, it can difficult to compare these hidden or additional costs between homes that have similar typical costs. For instance, if a first home has a pool or an aged roof, the overall cost of the first home may end up being significantly higher than the overall cost of a second home (e.g., without a pool or with a new roof), even when the listing prices for the first and second homes are comparable.

BRIEF SUMMARY

The present embodiments may relate to systems and methods for leveraging a user-defined budget constraint and/or data accessible at one or more external databases to execute a customized home search and/or identify one or more hidden costs. A home cost analysis server, as described herein, may maintain a home cost analysis platform accessible through a software application installed and run on a user computing device. The home cost analysis server may be configured to receive user input defining a budget and, based upon the user input, provide customized home search results to the user through the software application. The home cost analysis server may further facilitate more precise determination of the affordability of a home by leveraging historical home costs for other, similar homes to estimate additional or hidden home costs for a particular prospective home. The user may then more accurately and precisely compare prospective homes based on the additional home costs, not just a listing price.

In one aspect, a home cost analysis server for identifying home costs includes a processor in communication with a memory. The processor is programmed to train an image processing program to identify features of homes from at least one image or other metadata associated with those homes, by inputting sample datasets of images and metadata of homes into the image processing program, to generate a machine-learned image processing program. The processor is also programmed to receive user input from a user computing device associated with a prospective homebuyer, the user input including a prospective home, and access a first external database storing metadata and images associated with homes available for purchase, the homes including the prospective home. The processor is further programmed to input one or more images of the prospective home as inputs to the machine-learned image processing program, which outputs at least one feature of the prospective home depicted in the one or more images of the prospective home, and access a second external database storing historical ancillary costs associated with homes in a geographic area in which the prospective home is located, wherein ancillary costs are based upon the geographic area and at least one feature of a respective home. The processor is also programmed to perform a lookup in the second external database using an identifier representing the at least one outputted feature to retrieve comparable historical ancillary costs associated homes having a similar or comparable feature to the at least one outputted feature of the prospective home, analyze the metadata associated with the prospective home, the at least one outputted feature of the prospective home, and the comparable historical ancillary costs to determine one or more ancillary home costs associated with the prospective home, and display, at the user computing device, the one or more ancillary home costs and an anticipated overall monthly home cost for the prospective home.

In another aspect, a computer-implemented method for identifying home costs is implemented using a home cost analysis server including a processor in communication with a memory. The method includes training an image processing program to identify features of homes from at least one image or other metadata associated with those homes, by inputting sample datasets of images and metadata of homes into the image processing program, to generate a machine-learned image processing program, and receiving user input from a user computing device associated with a prospective homebuyer, the user input including a prospective home. The method also includes accessing a first external database storing metadata and images associated with homes available for purchase, the homes including the prospective home, and inputting one or more images of the prospective home as inputs to the machine-learned image processing program, which outputs at least one feature of the prospective home depicted in the one or more images of the prospective home. The method further includes accessing a second external database storing historical ancillary costs associated with homes in a geographic area in which the prospective home is located, wherein ancillary costs are based upon the geographic area and at least one feature of a respective home, and performing a lookup in the second external database using an identifier representing the at least one outputted feature to retrieve comparable historical ancillary costs associated homes having a similar or comparable feature to the at least one outputted feature of the prospective home. The method also includes analyzing the metadata associated with the prospective home, the at least one outputted feature of the prospective home, and the comparable historical ancillary costs to determine one or more ancillary home costs associated with the prospective home, and displaying, at the user computing device, the one or more ancillary home costs and an anticipated overall monthly home cost for the prospective home.

In a further aspect, a non-transitory computer-readable storage medium having computer-executable instructions embodied thereon is provided. When executed by a home cost analysis server including a processor in communication with a memory, the computer-executable instructions cause the processor to train an image processing program to identify features of homes from at least one image or other metadata associated with those homes, by inputting sample datasets of images and metadata of homes into the image processing program, to generate a machine-learned image processing program, and receive user input from a user computing device associated with a prospective homebuyer, the user input including a prospective home. The computer-executable instructions also cause the processor to access a first external database storing metadata and images associated with homes available for purchase, the homes including the prospective home, and input one or more images of the prospective home as inputs to the machine-learned image processing program, which outputs at least one feature of the prospective home depicted in the one or more images of the prospective home. The computer-executable instructions further cause the processor to access a second external database storing historical ancillary costs associated with homes in a geographic area in which the prospective home is located, wherein ancillary costs are based upon the geographic area and at least one feature of a respective home, and perform a lookup in the second external database using an identifier representing the at least one outputted feature to retrieve comparable historical ancillary costs associated homes having a similar or comparable feature to the at least one outputted feature of the prospective home. The computer-executable instructions also cause the processor to analyze the metadata associated with the prospective home, the at least one outputted feature of the prospective home, and the comparable historical ancillary costs to determine one or more ancillary home costs associated with the prospective home, and display, at the user computing device, the one or more ancillary home costs and an anticipated overall monthly home cost for the prospective home.

In one aspect, a home cost analysis server for identifying home costs to prospective home buyers may be provided. The home cost analysis server includes at least one processor in communication with a memory. The at least one processor is programmed to receive user input from a user computing device, the user input provided to the user computing device by a prospective homebuyer, the user input including at least one prospective home. The at least one processor is also programmed to access a first external database storing metadata associated with a plurality of homes available for purchase, the plurality of homes including the prospective home, and access a second external database storing historical ancillary costs associated with a plurality of homes in a geographic area in which the prospective home is located. The at least one processor is further programmed to analyze metadata associated with the prospective home and the historical ancillary costs to determine one or more ancillary home costs associated with the prospective home, wherein the metadata associated with the prospective home includes at least one of a listing price of the prospective home, an age of the prospective home, a building material of the prospective home, an image of the prospective home, a characteristic of the prospective home, and the geographic location area. The at least one processor is programmed to cause to be displayed the one or more ancillary home costs at the user computing device using at least one graphical indicator. The server or computer system may include additional, less, or alternate functionality including that discussed elsewhere herein.

In another aspect, a computer-implemented method for identifying home costs to prospective home buyers may be provided. The method may be implemented using a home cost analysis server including at least one processor in communication with a memory. The method includes receiving user input from a user computing device, the user input provided to the user computing device by a prospective homebuyer, the user input including at least one prospective home, accessing a first external database storing metadata associated with a plurality of homes available for purchase, the plurality of homes including the prospective home, and accessing a second external database storing historical ancillary costs associated with a plurality of homes in a geographic area in which the prospective home is located. The method also includes analyzing metadata associated with the prospective home and the historical ancillary costs to determine one or more ancillary home costs associated with the prospective home, wherein the metadata associated with the prospective home includes at least one of a listing price of the prospective home, an age of the prospective home, a building material of the prospective home, an image of the prospective home, a characteristic of the prospective home, and the geographic area. The method further includes causing to be displayed the one or more ancillary home costs at the user computing device using at least one graphical indicator. The method may include additional, less, or alternate actions, including those discussed elsewhere herein, and may be implemented via one or more local or remote processors.

In yet another aspect, at least one non-transitory computer-readable storage media having computer-executable instructions embodied thereon may be provided. When executed by a home cost analysis server including at least one processor in communication with a memory, the computer-executable instructions may cause the at least one processor to receive user input from a user computing device, the user input provided to the user computing device by a prospective homebuyer, the user input including at least one prospective home, access a first external database storing metadata associated with a plurality of homes available for purchase, the plurality of homes including the prospective home, and access a second external database storing historical ancillary costs associated with a plurality of homes in a geographic area in which the prospective home is located. The computer-executable instructions may also cause the at least one processor to analyze metadata associated with the prospective home and the historical ancillary costs to determine one or more ancillary home costs associated with the prospective home, wherein the metadata associated with the prospective home includes at least one of a listing price of the prospective home, an age of the prospective home, a building material of the prospective home, an image of the prospective home, a characteristic of the prospective home, and the geographic area. The computer-executable instructions may also cause the at least one processor to cause to be displayed the one or more ancillary home costs at the user computing device using at least one graphical indicator. The instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIGS. 4-9 depict exemplary screen captures of a home cost analysis platform maintained using the system shown in FIG. 3;

Figure 1:
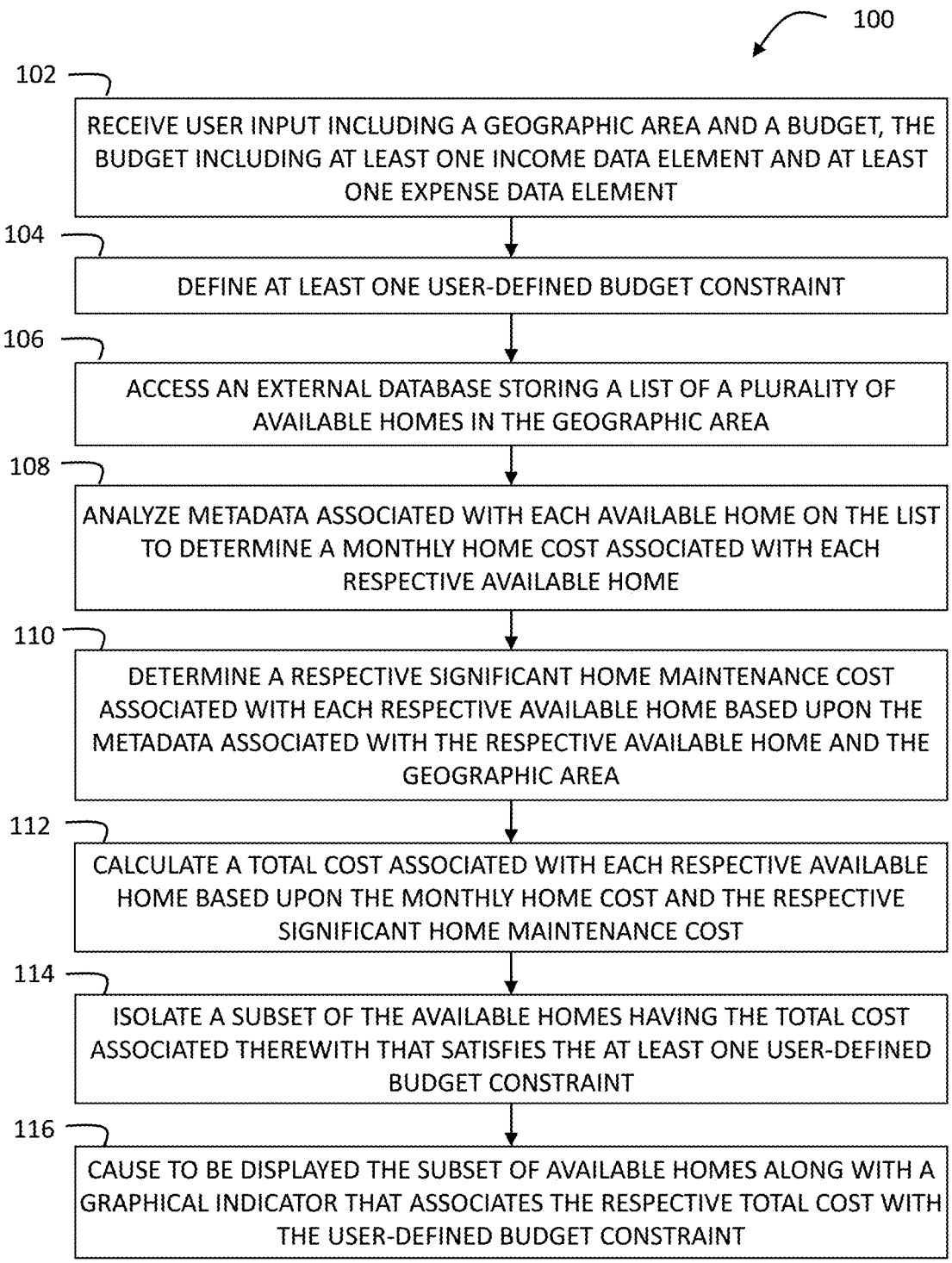
FIG. 1 depicts a schematic view of an exemplary embodiment of a method 100 for executing a customized home search and developing a potential property list based upon a user-defined budget constraint.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for leveraging a user-defined budget constraint and/or data accessible at one or more external databases to execute a customized home search and/or identify one or more hidden home costs for a prospective home buyer. The systems and methods described herein include a home cost analysis server (or computer device or computer system) for executing the customized home search and accessing external data to identify the hidden or "home maintenance" costs. The home cost analysis server may refine results of the customized home search with the one or more home maintenance costs. The home cost analysis server may be maintained by and/or associated with an insurance provider (and/or another party associated with a home purchase process). Accordingly, the home cost analysis server may be suitably secured to enable access to stored and/or encrypted data such as repair data, claims data, and/or other data, which may then be decrypted and aggregated, anonymized, and/or otherwise removed of personally identifiable information (PII) for processing of the data. The home cost analysis server may further maintain a computing platform (a "home cost analysis platform") such that the functionality of the home cost analysis server is accessible to a user via a user computing device (e.g., a smart phone, laptop, etc.). The home cost analysis server may provide results of the customized home search and/or one or more home maintenance costs at a graphical user interface (e.g., of an app) at the user computing device. The home cost analysis server may include at least one processor in communication with a memory. In some embodiments, the memory may include one or more storage devices, including cloud storage devices, internal memory devices, non-centralized databases, and/or combinations thereof. The user computing device may also include at least one processor in communication with a memory, such as a mobile device.

In one particular embodiment, historical cost data about hidden home costs for a plurality of homes is gathered and leveraged to model a "true cost" for a particular prospective home. The home cost analysis platform may be utilized to provide an "apples to apples" price comparison for users or prospective home buyers during their home search process. Because these external factors (e.g., additional or hidden home costs) act as constants, the projected "true cost" for each home will be the same for every customer, regardless of the user's personal situation. Put another way, the home cost analysis platform is designed to inform prospective home buyers how much a particular prospective home will cost them.

A user of the home cost analysis platform may be referred to herein as a "prospective home buyer." Such a user or prospective home buyer may include a person(s) seeking their first home, a homeowner seeking a new home, and/or any other user that may not be seeking a home but may be researching homes in an area and/or home maintenance costs for projects they are interested in performing at their current home.

A "budget," as described herein, refers to a collection of user inputs describing the user's income and expenses. The budget may be updated at any time by the user that created it. The budget may include additional data, such as goals (e.g., savings goals, debt repayment goals), timelines, etc. The budget may be a daily, weekly, monthly, annual, or otherwise-timed budget.

As used herein, "home maintenance data" may include at least two types of data associated with a home, specifically "ancillary expense" data and "repair" or "direct maintenance" data. Ancillary expense data refers to those expenses that may be incurred for items associated with being a homeowner that may be dictated at least in part by a geographic location of a home and/or one or more features of the home, such as whether the home has a pool or a lawn. For instance, ancillary expense data may include pool maintenance costs or the cost of a lawnmower. Repair or direct maintenance data refers to those expenses that may be incurred for performing repairs or preventative maintenance directly to a home, such as roof repair or foundation repair. Home maintenance data is distinguished from, for example, "monthly home costs," which include "typical" costs, such as a monthly mortgage payment, taxes, and home insurance.

In one exemplary embodiment, a user (e.g., a prospective home buyer) may access the home cost analysis application or platform via a client application ("app") executed on a user computing device. The user computing device may include, for example, a mobile phone, a smart phone, a tablet, a laptop computer, other mobile device, etc. The user may additionally or alternatively access the home cost analysis platform via a website accessed using a web browser on a user computing device.

The home cost analysis platform is maintained by the home cost analysis server (or computing device/system). The home cost analysis server may be associated with a particular entity, such as an insurance provider, a real estate listing provider, a home maintenance provider, and/or any other party or combination of parties. In the example embodiment, the home costs analysis server is associated with an insurance provider.

In addition, the home cost analysis server may have access to data stored in one or more databases, referred to herein as "external" databases as such databases are external to the home cost analysis server. External databases may collectively or individually be associated with and/or maintained by any particular entity, such as the insurance provider (e.g., the database may contain claims data associated with past claims), a real estate listing provider (e.g., the database may contain data and/or metadata associated with active and/or past real estate listings), a home maintenance provider (e.g., the database may contain data associated with home maintenance services and associated costs), and/or any other party or combination of parties. The home cost analysis server may access data stored at an external database directly and/or through an API, which may be maintained by the home cost analysis server and/or by the party associated with that particular external database. In the example embodiment, at least some of the data stored in an external database is encrypted, secured, or otherwise inaccessible to a general computing device such as a typical user computing device. The home cost analysis server may include any suitable decryption or data-access components such that the home cost analysis server may access the data stored in the external databases for processing and eventual presentment to the user.

The user (e.g., a prospective home buyer) accesses the home cost analysis platform in order to identify one or more potential homes that may be available for purchase and to determine whether such a potential home is affordable. The home cost analysis platform facilitates a home search according to specific user-defined criteria as well as a plurality of home maintenance costs that may be incurred above and beyond the "typical" or "expected" costs of homeownership (e.g., mortgage payments, insurance payments, tax payments, collectively "monthly home costs").

The home cost analysis server receives user inputs from the user via the user computing device. As described further herein, the user inputs may include a user-defined budget. A budget may include expenses (e.g., recreation/entertainment costs, current or prospective housing costs, groceries/food costs, service of any debts, etc.), income, and/or goals (e.g., saving and/or spending goals). In some embodiments, the home cost analysis platform may enable the user to rank or identify some elements of the budget according to relative importance and/or rigidity/flexibility. For instance, a particular savings goal may be ranked as the most important, over other savings goal(s). As another example, certain expenses (e.g., recreation) may be identified as less rigid or more flexible, whereas utility costs or debt service may be identified as more rigid or less flexible.

A user-defined budget constraint is defined at least in part based upon the income and expenses input by the user. The user-defined budget constraint may include, for example, a maximum monthly payment and/or a target monthly payment (less than the maximum monthly payment) that may be associated with a potential new home. The user-defined budget constraint may include additional and/or alternative values or terms. For instance, a user-defined budget constraint may be a particular number of months that may be required to meet a savings goal, based upon the income and expenses input by the user. A budget may include more than one user-defined budget constraint, based upon the input from the user of the income/expenses and/or user preferences, which may be entered using the home cost analysis platform via the user computing device.

The home cost analysis platform may develop the user-defined budget constraint based upon one or more assumptions, algorithms, calculations, models, forecasting data, historical data, and/or other data, including individual data specific to the user (e.g., input by the user) and/or general or aggregated data representative of an entire population and/or a segment of a population to which the user belongs. The home cost analysis platform may additionally or alternatively use any assumptions, algorithms, calculations, models, forecasting data, historical data, and/or other data, including individual data specific to the user and/or general or aggregated data representative of an entire population and/or a segment of a population to which the user belongs to develop suggestions and/or recommendations to the user, including potential homes, typical monthly home costs associated therewith, and/or hidden or unexpected costs associated therewith. It is contemplated that the home cost analysis platform, as maintained by the home cost analysis server, may provide education and information to a prospective homebuyer than may be otherwise unattainable and/or difficult or time-consuming to obtain by any one individual using traditional research techniques.

In the example embodiment, the home cost analysis server is configured to use the user-defined budget constraint to organize a list of potential homes that satisfy the user-defined budget constraint from a larger, broader list of available homes. Such a broad list of available homes may be accessed by a user through a traditional home search platform, such as via the Multiple Listing Service® (MLS), Zillow®, Trulia®, Redfin®, etc. The home cost analysis server may access this full or broad list of a plurality of available homes from the traditional home search platform via an Application Programming Interface (API). However, it can be difficult for an individual user to discern which homes of many available homes suit a user-defined budget constraint without examining individual listings, as there are a variety of home cost considerations that are not captured merely in a list price of a home. The home cost analysis server is configured to refine these lists using metadata for each listed or available home and isolate a subset of the available homes that satisfy the user-defined budget constraint.

In some embodiments, which may be determined based upon user input or preference or by predefined system settings, the home cost analysis server only accounts for certain home costs in determining whether a particular available home satisfies the user-defined budget constraint.

For example, the home cost analysis server may process metadata associated with the available home to determine the monthly home costs, including an estimated monthly mortgage payment (e.g., based upon one or more potential mortgage lifetimes), an estimated monthly tax payment, an estimated monthly insurance payment, and/or an estimated monthly private mortgage insurance (PMI) cost (e.g., based upon a down payment of less than 20%). These monthly home costs may be understood as "typical" home costs and are generally available to a user upon viewing a listing for a home using one or more available services, such as those listed above. However, such costs may still vary widely on a home-by-home basis without specific regard to a listing price for the home. Accordingly, even where the home cost analysis server only determines the subset of available homes based upon the "typical" monthly homes costs satisfying the user-defined budget constraint, the home cost analysis server still provides a unique service unavailable through typical home-search services.

In other embodiments, the home cost analysis server accounts for additional "hidden" home maintenance costs in determining whether a listed home satisfies the user-defined budget constraint. Such additional home maintenance costs to be included may be selected by the user individually (e.g., a user wishes to include potential roof repair costs over a lifetime of the mortgage) or collectively (e.g., a user wishes to include all exterior maintenance/landscaping costs over the course of a year). Alternatively, the home cost analysis server may select certain home maintenance costs to include based upon user preferences from a plurality of other, similar users, and/or may select a plurality of combinations of home maintenance costs to include and generate a subset of available homes that satisfies the user-defined budget constraint under one or more of such sub-combinations. The home cost analysis platform, as maintained by the home cost analysis server and as described further herein, is designed to offer maximum flexibility to the user in setting priorities and preferences such that the filtered list of available homes presented to the user is a more precise list that is more likely to meet the actual needs and expectations of the user.

In certain embodiments, the home cost analysis server may identify and present the subset of available homes that meet the user-defined budget constraint based only upon the "typical" monthly home costs but may display one or more additional graphical or textual indicators to convey to the user the relative amounts of the additional home maintenance costs (e.g., per-home or as a comparison between two or more home on the list).

In some embodiments, the home cost analysis server may identify one or more significant home maintenance costs for each home to determine whether a home satisfies the user-defined budget constraint. A "significant" home maintenance cost may include any home maintenance cost that meets a magnitude threshold. In some instances, the magnitude threshold may include a predefined threshold percentage of the monthly home costs. For example, if a home maintenance cost is estimated to cost more than 5% (or 10% or 15% or any other percentage) of the monthly home cost, the home cost analysis server may classify such a home maintenance cost as "significant." Such a home maintenance cost may include, for instance, a utility bill in a particular old home without updated windows, or a homeowner's association fee, or additional insurance costs (e.g., adding flood insurance for a home located in a flood plain), etc. In other instances, the magnitude threshold may include a predefined annual threshold amount. For example, if a home maintenance cost is estimated to cost more than $1,000 (or $3,000, or $5,000, or any other amount) over the course of a year, the home cost analysis server may classify such a home maintenance cost as "significant." Such a home maintenance cost may include, for example, lawn maintenance costs for a large yard, pool maintenance, etc. In other instances, the magnitude threshold may include a predefined one-time threshold cost. For example, if a home maintenance cost is estimated to cost more than $3,000 (or $1,000, or $10,000, or a percentage of a down payment, or any other value) for a single project or item, the home cost analysis server may classify such a home maintenance cost as "significant." Such a home maintenance cost may include, for example, a new roof, new windows, a kitchen update, etc. The home cost analysis server may use metadata associated with a home and/or external data (described further herein) to determine one or more significant home maintenance costs associated with a home.

The home cost analysis server is configured to identify additional home maintenance costs by accessing one or more external databases. For example, one external database is maintained by an insurance provider and includes data associated with claims and/or repairs of homes insured by the insurance provider. Such claims and repairs data may be secured and/or encrypted and accordingly may be inaccessible to an individual user but through the home cost analysis server as an intermediary (to anonymize/aggregate/process the data prior to presenting the data to the user). As another example, an external database may be maintained by a provider of home services, such as repair services, and/or a provider a service platform, such as AngiesList® or HomeAdvisor®. Such an external database may include data such as repair/maintenance services provided, providers of such services, costs for such services (according to one or more factors such as geographic location, scope of project, etc.), and/or additional or alternative data. The home cost analysis server may transmit a request message to the external database, the request message including one or more credentials of the home cost analysis server that indicate the home cost analysis server has permission to access the data stored at the database. The home cost analysis server may then be permitted to access or retrieve any data stored in the external database for subsequent processing, as described herein. In other cases, the external database may be maintained by any suitable third-party that has an agreement with the home cost analysis server, and may include any other relevant or useful data. For instance, another external server may include data on goods or services purchased after a home purchase. Such "post-purchase data" may be aggregated and processed to identify common purchases for first-time homebuyers and/or how much is spent on various purchases after a home is purchased.

The home cost analysis server may be configured to perform any suitable analyses on metadata associated with an available home and/or external data accessed from an external database (such external data associated with available and/or unavailable homes) to identify homes that satisfy the user-defined budget constraint, particularly those homes that satisfy the user-defined budget constraint with the significant home maintenance cost(s) included. In addition, the home cost analysis server is configured to provide any of the above-described analyses for a particular home selected by the user (e.g., separate from a broader home search).

In some embodiments, the home cost analysis server is configured to use image-processing (e.g., machine-learned image-processing) to determine characteristics or metadata associated with a home. For instance, a listing of a home available for purchase may have a plurality of images associated with the posting. The home cost analysis server may analyze the image(s) to determine certain features the home has or does not have, such as an approximate size, a number of windows, a garage or lack thereof, etc. In some embodiments, the home cost analysis server may compare the results of such image analysis to the metadata in the listing to verify that the listing is accurate. Additionally or alternatively, the home cost analysis server may receive one or more images from the user computing device through the home cost analysis platform (e.g., an image uploaded by a user) and may compare the received image to the listing metadata. The home cost analysis server may conclude whether the metadata is accurate or up-to-date based upon the uploaded/received image.

In still other embodiments, the home cost analysis server is configured to access data associated with home purchases completed within the geographic area. Such data may be accessed from an external database that offers a home listing service. The home cost analysis server may only access data associated with home purchases completed within a particular range of time (e.g., one year prior to date of access, six months prior to date of access, two months prior to date of access, etc.). The home cost analysis server may then determine a purchase price trend of the home purchases within the geographic area. For instance, homes in the geographic area may be selling for 5% under listing price, or may be selling for 10% over listing price, etc. The home cost analysis server may conduct the above-described analyses based upon the listing price and based upon a predicted price, which is determined using the listing price and purchase price trend. For example, for a geographic area in which homes are tending to sell at 5% below listing price, the home cost analysis server may present monthly home costs and/or total costs (e.g., monthly home costs plus any determined or calculated home maintenance costs) based upon a listing price for the home (e.g., monthly home costs of $1,500) and based upon the predicted price (e.g., monthly home costs of $1,425).

In one or more embodiments, the home cost analysis server generates a plurality of user-defined budget constraints that represent "tiers" or levels of affordability. For instance, the home cost analysis server may generate the maximum monthly payment that would be affordable for the user, a target monthly payment (less than the maximum monthly payment) that would be more "comfortable" or less of a financial hardship, and a "safe" or "cushion" monthly payment (less than the target monthly payment) that would offer a savings opportunity or would otherwise be more affordable to the user than the maximum or target monthly payments. The home cost analysis server may then use those varying user-defined budget constraints to identify a plurality of varying subsets of available homes. The home cost analysis server may present one or more of the plurality of subsets to the user via the home cost analysis platform. In so doing, the home cost analysis server facilitates the user making informed decisions about the home that is the right "fit."

Moreover, the home cost analysis server is further configured to compare the costs of homeownership to the user's current living costs. For instance, the user may input their living expenses into the home cost analysis platform as part of their budget. The living expenses may include housing expenses (e.g., a current rent or a current mortgage/insurance/tax payment), current utility expenses (e.g., electric and/or gas costs for a renter, additional utilities for a current homeowner), and/or additional housing expenses of the user's current living situation (e.g., parking fees, HOA dues, etc.). For one or more homes of the subset of homes, the home cost analysis server may present a comparison to the user of their current living expenses versus the expected living expenses to be incurred upon purchase of that home (s). In so doing, the home cost analysis server may provide education to a first-time homebuyer about whether a home would be more affordable than renting or whether such a user should rent for a longer period of time, for example, to save money and provide a larger down payment to reduce eventual monthly mortgage payments.

Although the computer-implemented methods for executing a customized home search or identifying one or more home maintenance costs are described herein as being performed by a single home cost analysis server computing device, it should be understood that more than one computing device may perform the various actions and steps described herein as performed by the home cost analysis server computing device. In such cases, it should be understood that one or more home cost analysis server computing devices may perform such analysis for a plurality of user computing devices, or, in other words, may be a centralized processing and/or analysis device. One home cost analysis server computing device may service a plurality of user computing devices within one geographic location, and another home cost analysis server computing device may service a plurality of user computing devices within another geographic location. Having at least one centralized home cost analysis server computing device may facilitate increased data processing speeds, such that a user may manipulate user-input data and see the corresponding effects on the output data in substantially real-time. The centralized home cost analysis server computing device may have more processing power than a user computing device, which may be unable to individually access, process, and/or analyze data. The home cost analysis server computing device may therefor facilitate greater insight into how selection of a particular home in a home search or how changes in user input can have an effect on the user's bottom line. In addition, the home cost analysis server may facilitate incorporating real-time or current ancillary or direct maintenance data to ensure more precise and/or accurate outputs to the user.

Moreover, in having access to the external data (which may be encrypted or otherwise secured/inaccessible) via the centralized home cost analysis server computing device, more precise and/or accurate estimates of home maintenance costs may be developed, based on specific geographic locations and comparable homes in that same location. The home cost analysis server computing device facilitates maintaining the security of stored data while permitting analysis therefor and/or interaction therewith on behalf of a user.

At least one of the technical problems addressed by this system may include: (i) time-consuming, difficult, and/or laborious research to identify homes that satisfy a user-defined budget constraint via traditional home search platforms; (ii) inability to access data associated with additional home maintenance costs, thereby having true home costs obscured; (iii) lack of dynamic platform for incorporating a budget into a home search; and/or (iv) lack of consumer education into home maintenance costs associated with homeownership.

A technical effect of the systems and processes described herein may be achieved by performing at least one of the following steps: (a) receiving user input from a user computing device, the user input provided to the user computing device by a prospective homebuyer, the user input including at least one prospective home; (b) accessing a first external database storing metadata associated with a plurality of homes available for purchase, the plurality of homes including the prospective home; (c) accessing a second external database storing historical ancillary costs associated with a plurality of homes in a geographic area in which the prospective home is located; (d) analyzing metadata associated with the prospective home and the historical ancillary costs to determine one or more ancillary home costs associated with the prospective home, wherein the metadata associated with the prospective home includes at least one of a listing price of the prospective home, an age of the prospective home, a building material of the prospective home, an image of the prospective home, a characteristic of the prospective home, and the geographic area; and/or (e) causing to be displayed the one or more ancillary home costs at the user computing device using at least one graphical indicator.

The technical effect achieved by this system may be at least one of: (i) reduced time and effort required of the user to receive and consume home maintenance cost data; (ii) access to additional data repositories to increase precision and accuracy of home cost estimations through the security of the home cost analysis server; (iii) a platform that facilitates user input of budget data and subsequent updates thereto with dynamic response in home search; and/or (iv) leveraging historical or existing data about home maintenance costs to provide an accurate precise estimation of a home's overall or "true" cost, regardless of a user's personal situation.

Exemplary Method of Executing a Customized Home Search Based Upon a User-Defined Budget Constraint FIG. 1 depicts a schematic view of an exemplary embodiment of a method 100 for executing a customized home search and developing a potential property list based upon a user-defined budget constraint. In certain embodiments, the method is implemented using a home cost analysis server computing device, as described herein.

In one exemplary embodiment of method 100, the home cost analysis server receives 102 user input from a user computing device. The user computing device may include any suitable user computing device, such as a smart phone, tablet, laptop computing device, desktop computing device, wearable computing device (e.g., "smart glasses," "smart watch," etc.), and/or any other user computing device. The home cost analysis server may maintain a home cost analysis platform that is accessible to the user computing device via a software application ("app") and/or a website.

The user input is inputted or provided to the user computing device by a prospective homebuyer for purchase of a home available for purchase. The user input includes a geographic area and a budget, as described herein. The geographic area may be defined in any suitable way, such as via a ZIP code, a state or city designation, using a "drawn" outline of an area on a graphical map, GPS coordinates with a radius therearound, and/or using any other method of designation.

In some embodiments, the geographic area, budget, and/or any other user input may be maintained as part of a user profile of the prospective homebuyer at the home cost analysis platform. The user profile may include additional and/or alternative information, including log-in credentials, demographic information (e.g., age of the prospective homebuyer), lifestyle information (e.g. first-time homebuyer, veteran, etc.), and/or other information. It is contemplated that certain elements of the user profile may be pre-existing or imported from a user profile maintained with an associated party. For instance, where the home cost analysis server/platform is/are associated with an insurance provider, the prospective home buyer may already have a profile (or account) with the insurance provider, such that some of the information may already be available without the user having to input such information again. Moreover, it is contemplated that some information may be input to the user profile under the assistance of another entity, such as a real estate agent or representative of the insurance provider, and need not be directly input by user into the user computing device to be considered "provided by" or "input by" the user.

Moreover, it is contemplated that the home cost analysis platform may facilitate development of a budget at any level of detail. For example, the budget may include as few as two data points: a broad "income" data element and a broad "expense" data element. The home cost analysis server defines 104, based upon the at least one income data element and the at least one expense data element, at least one user-defined budget constraint. The home cost analysis server may determine the user-defined budget constraint using one more equations, algorithms, etc. along with the income data element and the expense data element. The budget may include any number of data elements that may collectively make up the income data element, such as different entries for employment income, investment income, entitlement income, etc. The budget may further include any number of data elements that may collectively make up the expense data element, such as debt, living costs, investment contributions, medical costs, etc. The budget may include other data elements, such as goals or timelines (e.g., target retirement date/age), or additional indicators associated with certain income or expense data elements. For instance, the indicator data elements may define a level of flexibility or, in contrast, rigidity of a particular income or expense data element. The expenses may, in some embodiments, be defined as a percentage of the income, such that the user-defined budget constraint is some other percentage of the income, such as a remainder percentage. In some embodiments, even if a particular percentage of the income is available (e.g., 40%), the home cost analysis server may have a predetermined maximum recommended percentage of income that should be spent on housing costs (e.g., 30%) and accordingly may not permit the user-defined budget constraint (where the budget constraint is associated with a monthly payment) above that predetermined percentage.

The home cost analysis server accesses 106 an external database storing a list of a plurality of available homes in the geographic area. As described herein, the home cost analysis server may access an external database of an existing home search platform via an API.

The home cost analysis server analyzes 108 metadata associated with each available home of the plurality of available homes on the list to determine a monthly home cost associated with each respective available home, the monthly home cost including a monthly mortgage, tax, and insurance payment. The metadata may include at least one of a listing price of the available home, an age of the available home, a building material of the available home, an image of the available home, a characteristic of the available home (e.g., a number of bedrooms or bathrooms, whether the home has a pool or a lawn, a roof type of the home, etc.), and a geographic location of the available home within the geographic area (e.g., a specific address, street, or neighborhood within the geographic area).

In one or more embodiment, the home cost analysis server is configured to determine certain metadata associated with the home. For instance, the home cost analysis server may access certain metadata such as an image of the home and may execute image-processing functionality to determine other metadata, such as a roof type, the existence or lack of features of the home (e.g., a driveway, lawn, etc.), the age of the home, one or more building materials of the home (e.g., a brick facade versus siding), or other such metadata. In other words, all of the metadata associated with a home need not be pre-populated within the external database, as the home cost analysis server may independently discern certain metadata using machine-learning, optical recognition, image-processing, and/or other capabilities.

The home cost analysis server determines 110 at least one respective significant home maintenance cost associated with each respective available home of the plurality of available homes based at least in part upon the metadata associated with the respective available home and the geographic area. As described herein, the significant home maintenance cost may be (and likely is) different for each available home and is dependent upon metadata for each home. For instance, the significant home maintenance cost for one home with over twenty windows may include new windows (if the metadata indicates the windows are older) and/or window treatments. The significant home maintenance cost for another home (which may have substantially the same square footage, bedrooms, and/or other characteristics) may be a new roof or lawn maintenance.

Subsequently, the home cost analysis server calculates 112 a total cost associated with each respective available home of the plurality of available homes based upon the monthly home cost and the at least one respective significant home maintenance cost. The home cost analysis server isolates 114 a subset of the available homes of the plurality of available homes having the total cost associated therewith that satisfies the at least one user-defined budget constraint. In other words, the subset of the available homes only includes those homes that satisfy the user-defined budget constraint, as defined based upon the user's user-input income and expenses. Depending on the user-defined budget constraint, user preferences, and/or programmed instructions for the home cost analysis server, a home may "satisfy" the user-defined budget constraint in various ways. Where the user-defined budget constraint is a maximum value, for instance, only homes with a total cost less than the maximum value may satisfy the user-defined budget constraint, or only homes with the total cost within a threshold margin of the maximum value (e.g., not exceeding 10% over the maximum value) may satisfy the user-defined budget constraint. Where the user-defined budget constraint is a range, only homes with a total cost falling within that range or within a predefined margin of that range (e.g., no more than 10% less than a minimum value of the range or no more than 10% more than a maximum value of the range) may satisfy the user-defined budget constraint.

The home cost analysis server causes 116 to be displayed the subset of available homes at the user computing device along with a graphical indicator that associates the total cost with the user-defined budget constraint. For instance, the home cost analysis server may display a bar chart, pie chart, graph, scale, and/or any other graphical indicator that provides a comparison to the user of total cost associated with each of the subset of available homes with the user-defined budget constraint (e.g., a target monthly payment). In one particular embodiment, the user-defined budget constraint is associated with a monthly payment (e.g., a maximum, target, or safe monthly payment). Each of the subset of available homes will have associated therewith a graphical indicator that compares the total monthly payment or cost, as a combination of the typical monthly home costs and at least one significant home maintenance cost, for that available home with the user-defined budget constraint. The graphical indicator includes a color scale (e.g., red, yellow, green) that indicates to the prospective homebuyer how well an available home satisfies the user-defined budget constraint. As certain other home maintenance costs are added into consideration, as described herein, an available home may transition from "yellow" to "red," indicating that when those other home maintenance costs are added onto the monthly payment, a house may become less affordable or unaffordable.

In some embodiments, the home cost analysis server receives a user selection of at least two available homes of the subset of available homes and generates a comparison of the total cost associated with each of the at least two available homes. The home cost analysis server may then cause to be displayed the comparison at the user computing device.

In some embodiments, the home cost analysis server executes a comparison between the user's current living costs and the total cost associated with an available home. For instance, in some embodiments, the at least one expense data element input by the user to the budget includes a current housing expense data element (e.g., rent cost, current mortgage cost, HOA dues, etc.). The home cost analysis server receives a user selection of one or more available homes of the subset of available homes, and generates a comparison of the current housing expense data element with the total cost associated with each selected home of the one or more available homes. The home cost analysis server may then cause to be displayed the comparison at the user computing device.

The home cost analysis server is configured to provide a dynamic home cost analysis platform to the user computing device, such that real-time variations in inputs can be substantially instantaneously accounted for in outputs to the user. In some embodiments, the home cost analysis server receives an update to the user input from the user computing device. In response, the home cost analysis server determines an updated user-defined budget constraint based upon the update to the user input, and re-accesses the stored list of the plurality of available homes at the external database. The home cost analysis server isolates an updated subset of available homes of the plurality of available homes that satisfy the updated user-defined budget constraint, and causes to be displayed the updated subset of available homes at the user computing device.

In other embodiments, the home cost analysis server identifies one or more elements of the budget that may be more flexible or variable, such as a recreation cost. The home cost analysis server is configured to suggest alternative budgets that may reduce some of these flexible elements, which may make additional homes available/affordable to the user. In some of these embodiments, the home cost analysis server may analyze one or more of the expense data element(s) input by the user into the budget to determine at least one adjusted expense data element. The home cost analysis server determines an adjusted user-defined budget constraint based upon the adjusted expense data element, and re-accesses the stored list of the plurality of available homes at the external database. The home cost analysis server isolates an adjusted subset of available homes of the plurality of available homes that satisfy the adjusted user-defined budget constraint, and causes to be displayed the adjusted subset of available homes at the user computing device along with the at least one adjusted expense data element and the adjusted user-defined budget constraint.

Alternatively, the home cost analysis server may receive selection of an available home that may not be one of the subset of available homes. The home cost analysis server may compare the total cost of the selected home to the user-defined budget constraint. The home cost analysis server may display a graphical indicator that alerts the user that this particular home does not satisfy the user-defined budget constraint. The home cost analysis server may then process the user-input budget and suggest an adjusted expense data element (or any other adjusted data element) that will sufficiently adjust the user-defined budget constraint such that the selected home then satisfies the adjusted user-defined budget constraint. For instance, the home cost analysis server may recommend adjust spending patterns, savings patterns, or timelines (e.g., a 30-year mortgage term as opposed to a 15-year mortgage term) to make a house affordable to the prospective homebuyer.

Exemplary Method of Identifying Home Costs to Prospective Home Buyers

Figure 2:
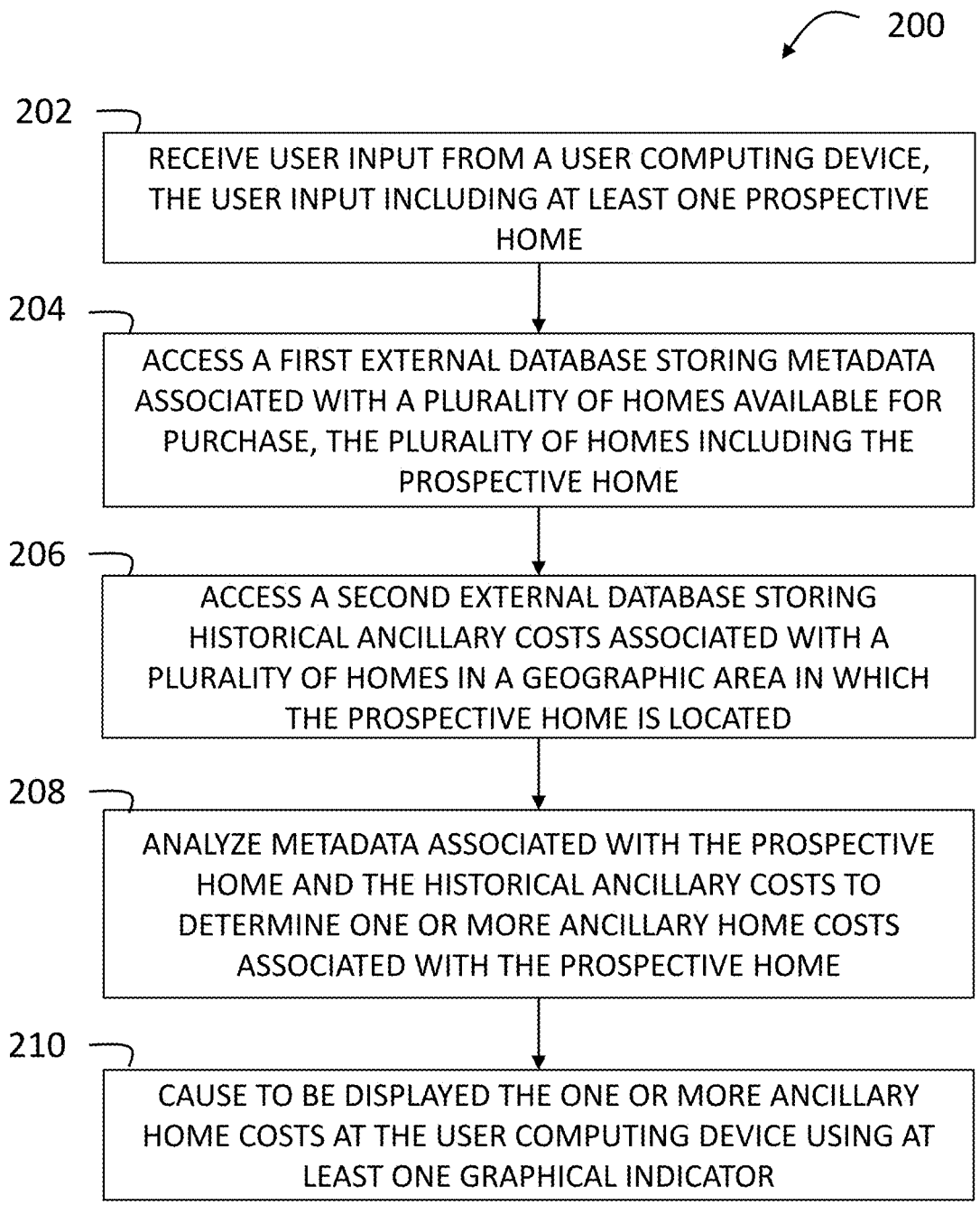
FIG. 2 depicts a schematic view of an exemplary embodiment of a method 200 for identifying home costs to prospective home buyers.

FIG. 2 depicts a schematic view of an exemplary embodiment of a method 200 for identifying home costs to prospective home buyers. In certain embodiments, the method is implemented using a home cost analysis server computing device, as described herein.

In one exemplary embodiment of method 200, the home cost analysis server receives 202 user input from a user computing device, as described above. In the example embodiment, the user input includes at least one prospective home. In some embodiments, the prospective home may include one of the subset of available homes identified according to the method 100 described above with respect to FIG. 1. In other embodiments, the prospective home may be another home (e.g., a home that does not satisfy the user-defined budget constraint and/or a home identified and selected by the user in a home search outside of the customized home search described above).

The home cost analysis server accesses 204 a first external database storing metadata associated with a plurality of homes available for purchase, the plurality of homes including the prospective home. The home cost analysis server may access 204, for example, a traditional home search platform via an API.

The home cost analysis server accesses 206 a second external database storing historical ancillary costs associated with plurality of homes in a geographic area in which the prospective home is located. The second external database may be associated with any entity configured to store such historical ancillary costs, such as a home service provider platform. The historical ancillary costs are associated with available and/or unavailable homes, and may overlap or not overlap with the plurality of available homes.

The home cost analysis server analyzes 208 metadata associated with the prospective home and the historical ancillary costs to determine one or more ancillary home costs associated with the prospective home. The metadata associated with the prospective home includes at least one of a listing price of the prospective home, an age of the prospective home, a building material of the prospective home, an image of the prospective home, a characteristic of the prospective home, the geographic area including the prospective home, and/or any other information. For example, the home cost analysis server may compare the prospective home to a plurality of the unavailable homes and identify one or more similar homes that share the same or similar metadata, where "similar" may include metadata that does not exactly match but that falls within a particular threshold defining similarity (e.g., within 10% of a value, such as square footage or age). The home cost analysis server may then determine historical ancillary costs of one or more of the identified similar homes. The home cost analysis server may adjust, average, aggregate, and/or otherwise process the historical ancillary costs to estimate one or more ancillary home costs associated with the prospective home.

In one or more embodiment, the home cost analysis server is configured to determine certain metadata associated with the prospective home. For instance, the home cost analysis server may access 204 certain metadata such as an image of the prospective home and may execute image-processing functionality to determine other metadata, such as a roof type, the existence or lack of features of the home (e.g., a driveway, lawn, etc.), the age of the home, one or more building materials of the home (e.g., a brick facade versus siding), or other such metadata. In other words, all of the metadata associated with a home need not be pre-populated within the first external database, as the home cost analysis server may independently discern certain metadata using machine-learning, optical recognition, image-processing, and/or other capabilities.

The home cost analysis server causes 210 to be displayed the one or more ancillary home costs at the user computing device using at least one graphical indicator. For instance, the home cost analysis server may display a bar chart, pie chart, graph, scale, and/or any other graphical indicator that provides an identification to the user of the home costs and/or the (estimated) ancillary costs of the prospective home, and/or that provides a comparison of those cost(s) with a user-defined budget constraint (e.g., a target monthly payment). In certain embodiments, the graphical indicator may have been displayed as described above with respect to method 100 (e.g., in display step 116), and causing 210 to be displayed at least one graphical indicator includes updating or adjusting the already-displayed graphical indicator with the ancillary cost(s). Such updating/adjusting may cause the graphical indicator to change color, shape, and/or content to indicate to the user whether the prospective home still satisfies the user-defined budget constraint. In some embodiments, in which the user input further includes a geographic area and a budget, the home cost analysis server may compare the one or more home maintenance costs with the budget, and cause to be displayed the comparison at the user computing device (e.g., via one or more graphical indicators).

In some embodiments, the home cost analysis server is further configured to receive user input of a second prospective home, and access (e.g., access 204) the first external database storing the list of a plurality of available homes, the plurality of available homes including the second prospective home. The home cost analysis server may then analyze (e.g., analyze 208) metadata associated with the second prospective home and the historical ancillary costs (e.g., as accessed 206 from the second external database) to determine one or more ancillary home costs associated the second prospective home. The home cost analysis server may generate a comparison of the one or more ancillary home costs associated with the first prospective home and the one or more ancillary home costs associated with the second prospective home, and cause to be displayed the comparison at the user computing device. In other words, in certain embodiments, the home cost analysis server may facilitate comparison of two or more user-selected prospective homes, including comparing estimated ancillary costs associated with each compared home. For instance, a user may wish to see the difference in potential ancillary costs between a home having a pool (and, thus, having one or more associated pool maintenance ancillary costs) and a home that does not have a pool.

In some embodiments, the home cost analysis server accesses a third external database storing historical direct maintenance costs associated with a plurality of insured home. The third external database may be associated with, for example, an insurance provider. In such cases, the third external database stores historical direct maintenance costs associated with insurance claims made on respective insured homes of the plurality of insured homes, for example, in the form of historical claims data and/or repair data from homes insured by the insurance provider. The third external database may additionally or alternatively be associated with one or more other entities, such as service/repair providers, and may accordingly store historical direct maintenance data provided by those one or more other entities. The home cost analysis server may then analyze the metadata associated with the prospective home and the historical direct maintenance costs to determine one or more direct maintenance costs associated the prospective home, and cause to be displayed the home or more direct maintenance costs at the user computing device including updating the at least one graphical indicator.

In some embodiments, the home cost analysis server is further configured to determine an estimated future time associated with a first direct maintenance cost of the one or more direct maintenance costs based upon the analysis of the metadata associated with the prospective home and the historical direct maintenance costs. In one particular example, the home cost analysis server determines an age of the home or an age of a feature of the home, and determines that repair/replacement/maintenance of the homes or the feature of the home is likely to be needed in a particular number of months or years based upon an analysis of the historical direct maintenance costs. If a roof of the home is determined to be about ten years old, and roof maintenance or replacement is determined to occur for roofs having an age of between 18 and 20 years, the estimated future time associated with a direct maintenance cost of roof repair/replacement may be about 8-10 years from a current date. The home cost analysis server may cause to be displayed the estimated future time at the user computing device in association with the displayed first direct maintenance cost.

As described above, in various implementations and in accordance with user preferences, any number of potential costs associated with a prospective home may be determined by the home cost analysis server and displayed to the user for consideration and/or comparison. The home cost analysis server provides the home cost analysis platform to the user (via the user computing device) to facilitate the education of the user in the (hidden) costs of home ownership, to the extent that the user is interested in "drilling down" into such individual costs. The home cost analysis server may access different external databases and/or provide different data to the user based upon a variety of factors, including the preference of the user, as well as certain characteristics of the home search. For instance, the target geographic location of the home may direct the home cost analysis server to access certain databases and/or lists to determine costs that are or are not likely associated with homes in such an area. If the target geographic area is the state of Arizona, the home cost analysis server may not attempt to determine average snow removal costs for homes, whereas the home cost analysis server may attempt to determine average snow removal costs for homes in a target geographic area of the state of Minnesota.

The home cost analysis server may access specific external database(s) and/or specific data within certain external database(s) associated with particular geographic areas, particular types of homes, and/or according to other common factors between homes to determine one or more home costs. For example, the cost of replacing a roof may vary between geographic areas, or the age of a roof before needing replacement may vary between geographic areas. The home cost analysis server may not access roof replacement costs for an entire nation to determine an estimated direct maintenance cost and/or timeline for a prospective home in a specific ZIP code, but instead may only access and/or process metadata for other homes in that ZIP code and/or in surrounding and/or similar geographic areas. As another example, where a prospective home is a 2,000 square foot home, the home cost analysis server may only access utility costs for homes having a square footage of 1,800-2,200 square feet to determine an estimated utility cost for the prospective home. The home cost analysis server may not access or process utility cost data for homes much larger or smaller than the prospective home, as such data may skew the results and reduce the accuracy and/or precision of the estimated home costs presented to the prospective home buyer.

In some cases, the home cost analysis server may be configured to mine data associated with available homes (e.g., from one or more external databases, such as a traditional home search platform) to determine what direct maintenance has already been performed on a prospective home. For example, a home may be listed with a description in prose and/or with a table of data. The description may include language such as "updated electrical in 2016" or may include a cell that indicates electrical work performed in 2016. The home cost analysis server may use such data to provide more precise direct maintenance cost estimates to the user. Following the same example, the home cost analysis server may suggest to the user to anticipate electrical maintenance costs further in the future and/or may reduce estimated electrical maintenance costs.

Moreover, the home cost analysis server may be configured to factor in the home costs that vary based upon the purchase conditions. For instance, the home cost analysis server may determine and present home costs based upon varying mortgage terms (e.g., different down payments, different mortgage lifetimes). The home cost analysis server may further account for certain lifestyle or demographic characteristics that may make certain purchase characteristics available (e.g., veterans or first-time homebuyers may qualify for alternative mortgage options).

As described above, in some embodiments, the home cost analysis server is configured to use image-processing (e.g., machine-learned image-processing) to determine characteristics or metadata associated with a home. For instance, a listing of a home available for purchase may have a plurality of images associated with the posting. The home cost analysis server may analyze the image(s) to determine certain features the home has or does not have, such as an approximate size, a number of windows, a garage or lack thereof, etc. In some embodiments, the home cost analysis server may compare the results of such image analysis to the metadata in the listing to verify that the listing is accurate. Additionally or alternatively, the home cost analysis server may receive one or more images from the user computing device through the home cost analysis platform (e.g., an image uploaded by a user) and may compare the received image to the listing metadata. The home cost analysis server may conclude whether the metadata is accurate or up-to-date based upon the uploaded/received image.

In still other embodiments, the home cost analysis server is configured to access data associated with home purchases completed within the geographic area. Such data may be accessed from an external database that offers a home listing service. The home cost analysis server may only access data associated with home purchases completed within a particular range of time (e.g., one year prior to date of access, six months prior to date of access, two months prior to date of access, etc.). The home cost analysis server may then determine a purchase price trend of the home purchases within the geographic area. For instance, homes in the geographic area may be selling for 5% under listing price, or may be selling for 10% over listing price, etc. The home cost analysis server may conduct the above-described analyses based upon the listing price and based upon a predicted price, which is determined using the listing price and purchase price trend. For example, for a geographic area in which homes are tending to sell at 5% above listing price, the home cost analysis server may cause to be displayed a first monthly home cost for the selected home for purchase of the home at a listing price determined using the metadata associated with the selected home (e.g., monthly home costs of $1,500), and cause to be displayed a second monthly home cost for the selected home for purchase of the home at a predicted price determined using the listing price and the purchase price trend. (e.g., monthly home costs of $1,575).

Exemplary Computer System

Figure 3:
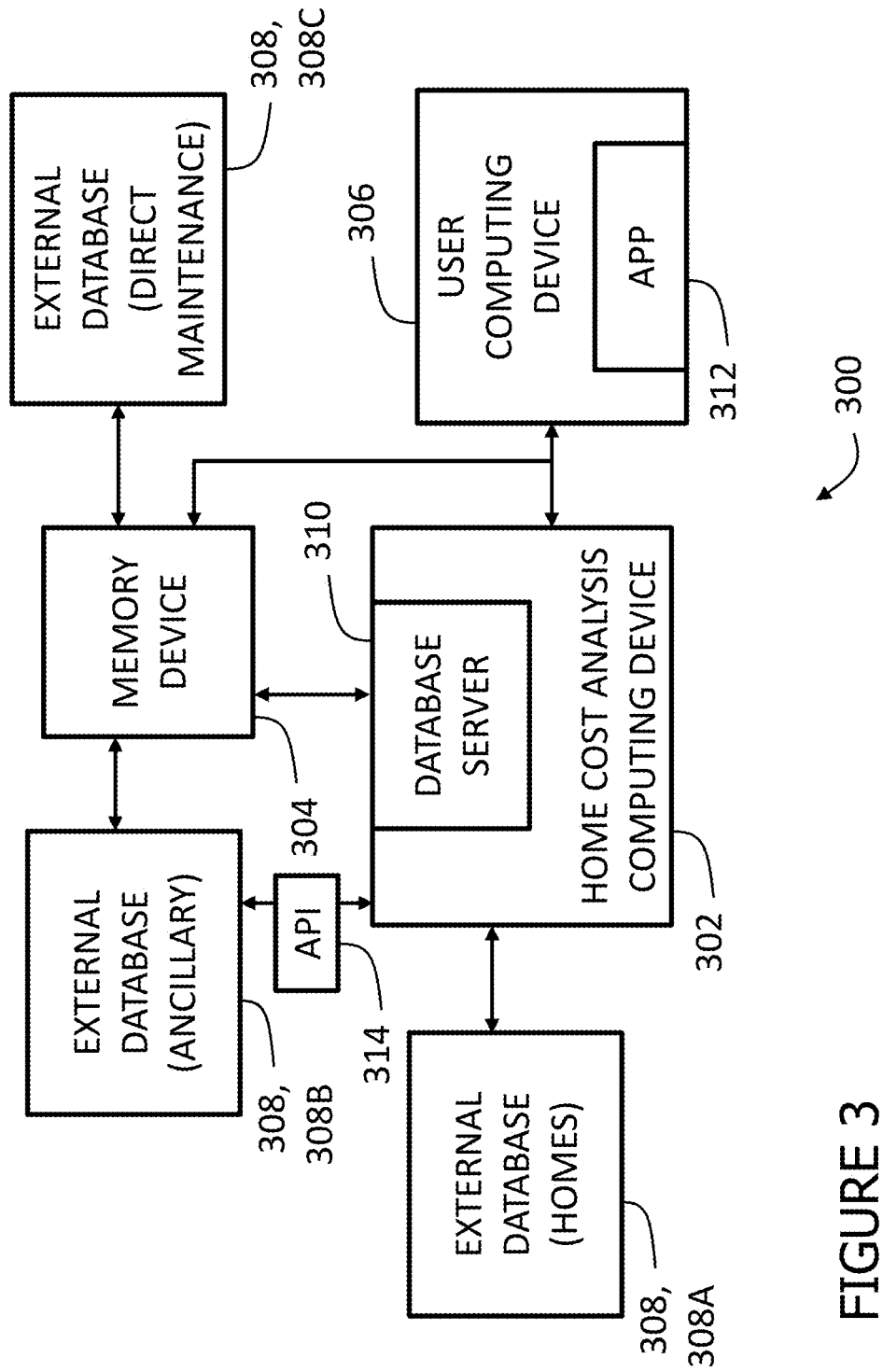
FIG. 3 depicts a schematic diagram of an exemplary property analytics system that may be used to implement the methods shown in FIGS. 1 and 2.

FIG. 3 depicts a schematic diagram of an exemplary property analytics system 300. Property analytics system 300 is configured to facilitate customized home searches and analysis of home maintenance costs of prospective homes. In one exemplary embodiment, property analytics system 300 may include and/or facilitate communication between one or more home cost analysis computing devices (servers) 302, a memory device 304, one or more user computing devices 306 (each associated with a respective user or prospective home buyer, not shown), and one or more external databases 308.

Home cost analysis server 302 may be any device capable of interconnecting to the Internet, including a server computing device, a mobile computing device, or other web-connectable equipment or mobile devices. Components of property analytics system 300 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

Additionally, a database server 310 may be connected to memory device 304 containing information on a variety of matters. For example, memory device 304 may include such information as accessed property information, processed property information, decryption keys, encryption keys, security credentials for accessing any of external databases 308, user profiles, user input, and/or any other information used, received, and/or generated by property analytics system 300, as described herein. In one exemplary embodiment, memory device 304 may include a cloud storage device, such that information stored thereon may be accessed by one or more components of property analytics system 300, such as, for example, home cost analysis server 302 or user computing device 306. In one embodiment, memory device 304 may be stored on home cost analysis server 302. In any alternative embodiment, memory device 304 may be stored remotely from home cost analysis server 302 and may be non-centralized.

Home cost analysis server 302 may be in communication with one or more user computing devices 306, such as via wireless communication or data transmission over one or more radio frequency links or wireless communication channels. In the exemplary embodiment, user computing devices 306 may be computers that include a web browser or a software application to enable home cost analysis server 302 o access user computing devices 306, and vice versa, using the Internet or a direct connection, such as a cellular network connection. More specifically, user computing devices 306 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computing devices 306 may be any device capable of accessing the Internet including, but not limited to, a desktop computer, a mobile device (e.g., a laptop computer, a personal digital assistant (PDA), a cellular phone, a smartphone, a tablet, a phablet, netbook, notebook, smart watches or bracelets, smart glasses, wearable electronics, pagers, etc.), or other web-based connectable equipment. Additionally, user computing devices 306 may be communicatively coupled to home cost analysis server 302 through many interfaces including, but not limited to, a direct cable connection, a Bluetooth® connection, and a Wi-Fi connection.

In some embodiments, home cost analysis server 302 may be associated with an insurance provider, a home services provider, and/or any other entity or entities. Home cost analysis server 302 is configured to maintain a home cost analysis platform (not specifically shown) accessible to a user via software application ("app") 312 on their user computing device 306. It should be readily understood that the home cost analysis platform may be accessible via a web browser on user computing device 306 and that references to an app 312 are non-limiting. Users, such as prospective home buyers, may register or sign up with the home cost analysis platform to access the home search and/or home cost determination services of home cost analysis server 302.

External databases 308 may be associated with separate, distinct entities and/or may all be associated with one entity. In the illustrated embodiment, external databases 308 include a first external database 308A that maintains and stores a list of available homes. First external database 308A may include or be associated with a home search or home listing service or platform, such as the Multiple Listing Service®. First external database 308A may further store data/metadata associated with the plurality of available homes, including data manually input by a listing agent or entity (e.g., description in prose or entries into cells of a table/form). External databases 308 further include a second external database 308B that maintains and stores historical ancillary costs associated with homes that may or may not be available for purchase. Second external database 308B may further store data/metadata associated with the homes identified in the historical ancillary cost data. Second external database 308B may be associated with a home maintenance/service provider or a platform for home service providers (e.g., AngiesList®, HomeAdvisor®, etc.). External databases 308 further includes a third external database 308C that maintains and stores historical direct maintenance costs associated with homes that may or may not be available for purchase. Third external database 308C may be associated with an insurance provider, such that the historical direct maintenance home cost data is associated with repairs and claims data of insured homes.

Home cost analysis server 302 may be in direct communication with external databases 308 and/or may be in indirect communication with external databases 308 (e.g., via an Application Programming Interface (API) 314). In the example embodiment, at least one of external database 308 stores data in an encrypted format, for instance, because the stored data includes personally identifiable information or other sensitive information. Home cost analysis server 302, as described herein, may store and use security credentials that enable access to the encrypted or otherwise secured data. Home cost analysis server 302 is configured to anonymize, aggregate, and/or otherwise "sanitize" any secured data before presenting data to any user, such that the data may be mined and processed but data security is maintained.

Exemplary Home Cost Analysis Platform/Software Application

FIGS. 4-9 depict exemplary screen captures or "screenshots" of the home cost analysis platform maintained by home cost analysis server 302, accessed by a user via app 312 on their user computing devices 306 (all shown in FIG. 3). The example screenshots include the results of a customized home search as well as home cost data generated by home cost analysis server 302, as described herein. Home cost analysis server 302 causes to be displayed the home search results and/or home cost data at user computing device 306, specifically via app 312.

More specifically, FIG. 4 depicts a screenshot 400 of a user input process to develop the user's budget (and, accordingly, one or more user-defined budget constraints). The user may enter their user input into a user interface (UI) 402 of app 312. As shown, the budget may include a plurality of categories 404 where the user enters their expenses and income. In the illustrated embodiments, the plurality of categories 404 include taxes, living expenses, savings, debt, retirement, and other expenses, but it should readily understood that categories 404 may include alternative and/or additional categories. The user may manipulate one or more controls, such as a text entry field 406, a slider 408, and/or any other user interface (UI) controls, to enter their income data and/or expense data. UI 402 may include one or more guides 410 or examples to assist the user in accurately and/or precisely entering their income and/or expense data. UI 402 may further include one or more graphical indicators 412 that display, in a dynamic fashion, the results of the user input. In the illustrated embodiment, a graphical indicator 412 includes a pie chart that displays a breakdown of the user's expenses. UI 402 also displays a user-defined budget constraint 414, shown in the example screenshot 400 as a target monthly payment.

Figure 5:
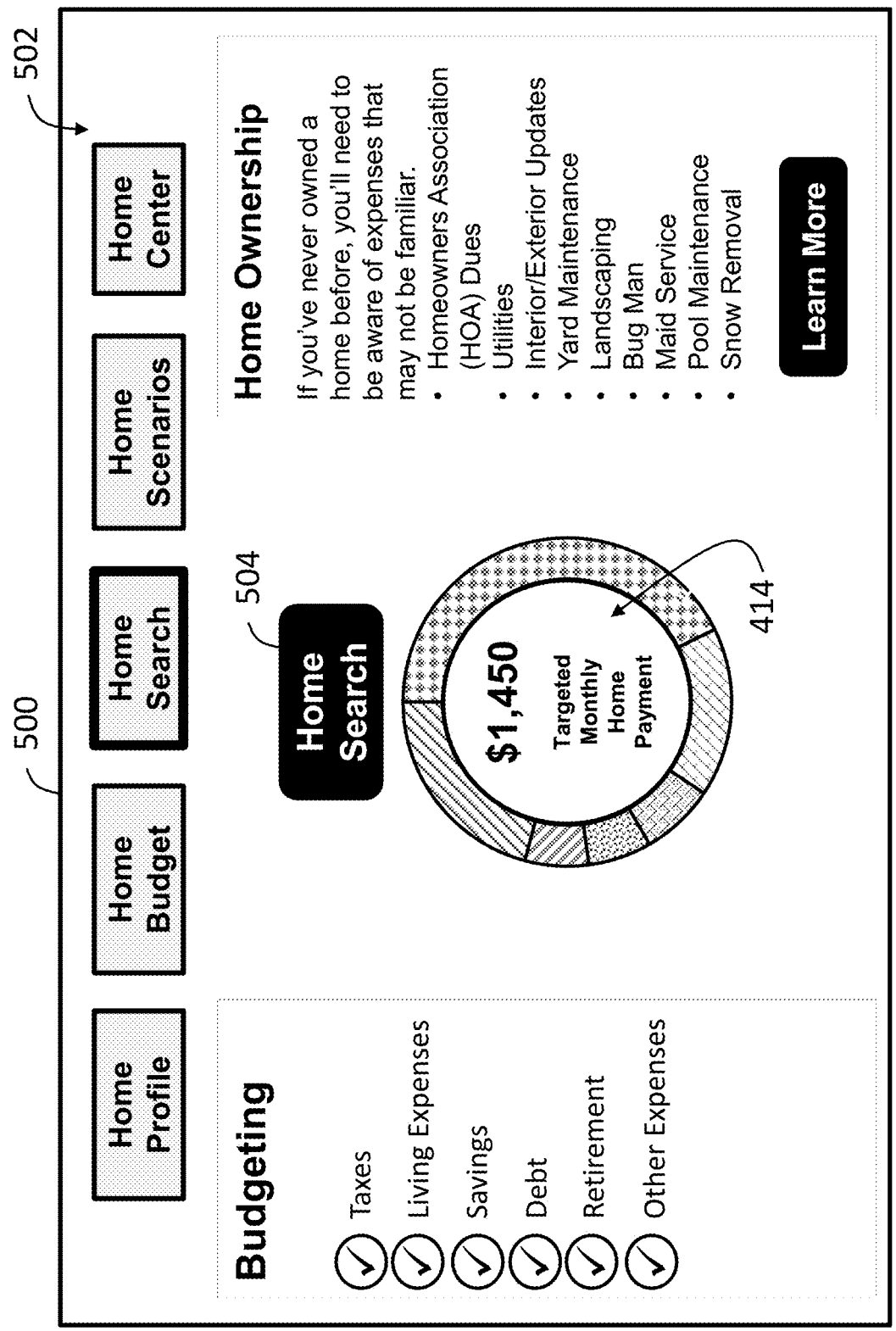

FIG. 5 depicts a screenshot 500 of the completion of the budgeting process and/or the beginning of a home search process. The user-defined budget constraint 414 is displayed to the user and is used by home cost analysis server 302 to isolate a subset of available homes that meet the user-defined budget constraint 414. A UI 502 may include one or more controls 504 that permit the user to initiate the home search and/or enter additional home search criteria, as described with respect to FIG. 6.

Figure 6:
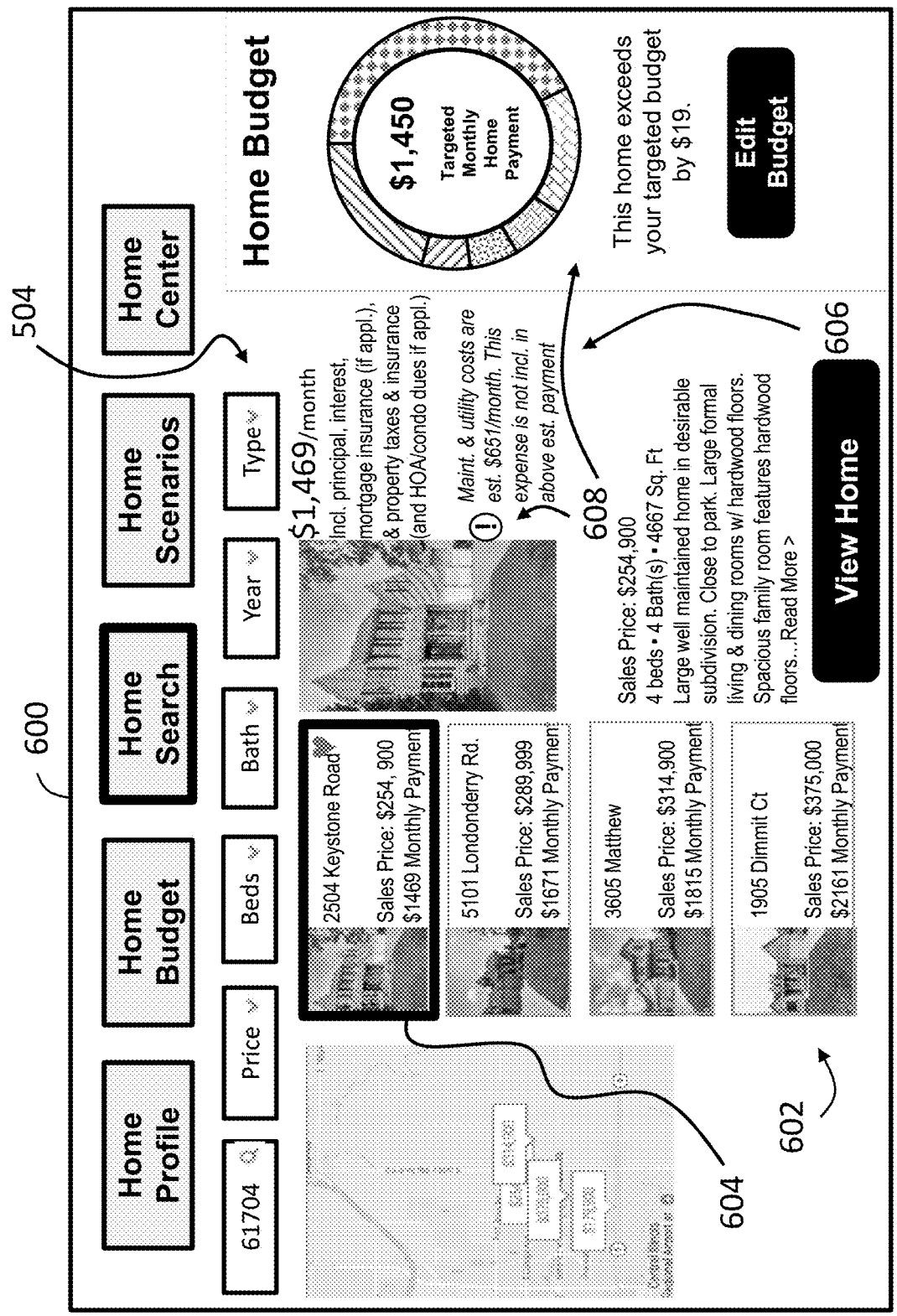

FIG. 6 depicts a screenshot 600 of a subset of available homes 602 that are displayed to the user in UI 502. The subset of available homes 602 are determined by home cost analysis server 302 and represent a subset of a plurality of available homes (not shown). UI 502 includes additional controls 504 that permit the user to refine the subset of available homes 602 according to user preferences, such as a target geographic area (e.g., a ZIP code), a maximum list price, a number of bedrooms, a number of bathrooms, a year the home was constructed, and a type of the home (e.g., single-family home, townhouse, apartment, multi-family home, etc.). It should be readily understood that UI 502 may include additional and/or alternative controls 504 for entering additional and/or alternative home search criteria.

A particular available home 604 is shown as selected by the user. Additional details 606 about the home 604 are displayed, including one or more graphical indicators 608 that indicate to the user whether or how well the home 604 satisfies the user-defined budget constraint 414. In the illustrated embodiment, home cost analysis server 302 has displayed a subset of homes 602 that includes certain homes that do not satisfy the user-defined budget constraint 414. For example, the selected home 604 has a monthly home cost that exceeds the user-defined budget constraint 414. Home cost analysis server 302 may be configured to defined a user-defined budget constraint 414 such as a target monthly payment that is a range as opposed to a discrete value, such that certain homes 602 may be displayed despite being slightly above the target monthly payment. Alternatively, home cost analysis server 302 may permit the user to seek and/or select certain homes that are not part of the subset of available homes 602 and may display how such homes' respective home costs compare to the user-defined budget constraint 414. Additionally or alternatively, home cost analysis server 302 may display homes in the subset of available homes 602 that would satisfy the user-defined budget constraint 414 under certain circumstances (e.g., a reduction in certain expenses).

FIG. 7 depicts a screenshot 700 of a user interface 702 in which home cost analysis server 302 displays to the user one or more variable options 704 that may affect a home cost (e.g., a monthly payment) of the selected home 604. UI 702 further includes additional information 706 about the potential of additional home costs that the prospective homebuyer may be unaware of.

FIG. 8 depicts a screenshot 800 of a user interface 802 in which home cost analysis server 302 permits the user to select certain ancillary costs 804 to factor in to a determination of a total home cost for the selected home 604. Home cost analysis server 302 has, as described herein, determined ancillary costs 804 for the selected home 604 based at least in part upon historical ancillary cost data for other, similar homes. The user may select from repeating and/or one-time ancillary costs 804 that home cost analysis server 302 may then use to calculate a total home cost for the selected home 604. In some cases, selecting ancillary costs 804 may cause the selected home 604 (or other available homes 602) to exceed a user-defined budget constraint. Home cost analysis server 302 may present one or more indicators to the user that the selected home 604 may not be affordable and/or may update the subset of available homes 602 displayed to the user in the home search.

Figure 9:
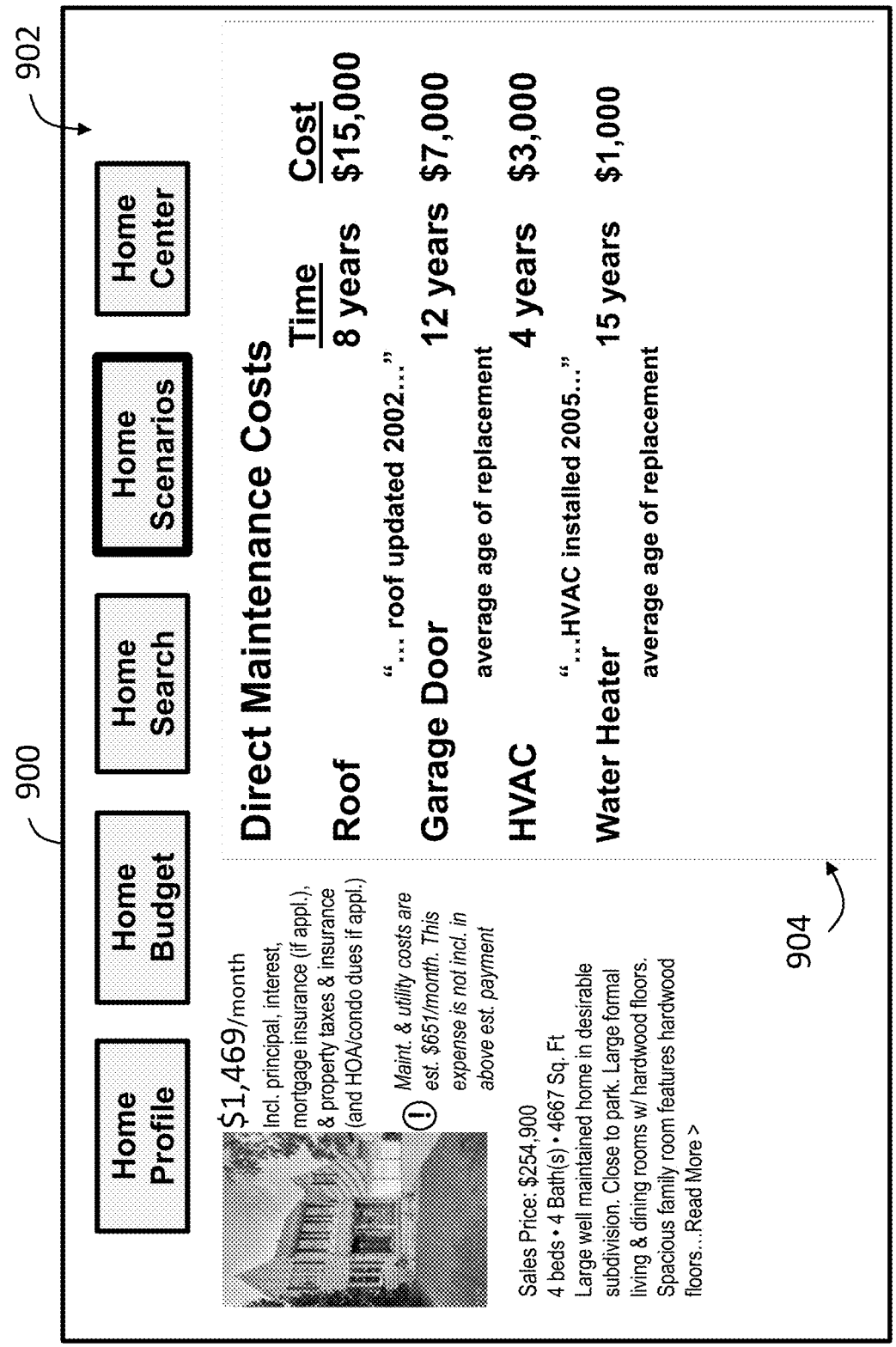

FIG. 9 depicts a screenshot 900 of a user interface 902 in which home cost analysis server 302 displays one or more direct maintenance costs 904 to the user. As described herein, home cost analysis server 302 has determined direct maintenance costs 904 for the selected home 604 based at least in part upon historical direct maintenance cost data for other, similar homes (e.g., available in a claims/repair database associated with an insurance provider). Each direct maintenance cost 904 may be associated with a future time at which the direct maintenance cost 904 may become needed or relevant. In the illustrated embodiment, UI 902 further includes additional details associated with each direct maintenance cost, such as a source for the future time (e.g., text from a listing of the home and/or estimation based upon the historical direct maintenance data) and/or the estimated cost 904. One or more of the displayed direct maintenance costs 904 may be indicated as a significant home maintenance cost. For instance, as the HVAC cost may be the mostly likely to occur first, and the estimated cost of repair/replacement is $3,000, such a home maintenance cost may exceed one or more thresholds to be classified as a significant maintenance cost.

It should be readily understood that the screenshots provided herein are for illustrative purposes only, and that the app 312 may include additional or alternative functionality and/or appearance without departing from the scope of the present disclosure.

Exemplary User Computing Device

Figure 10:
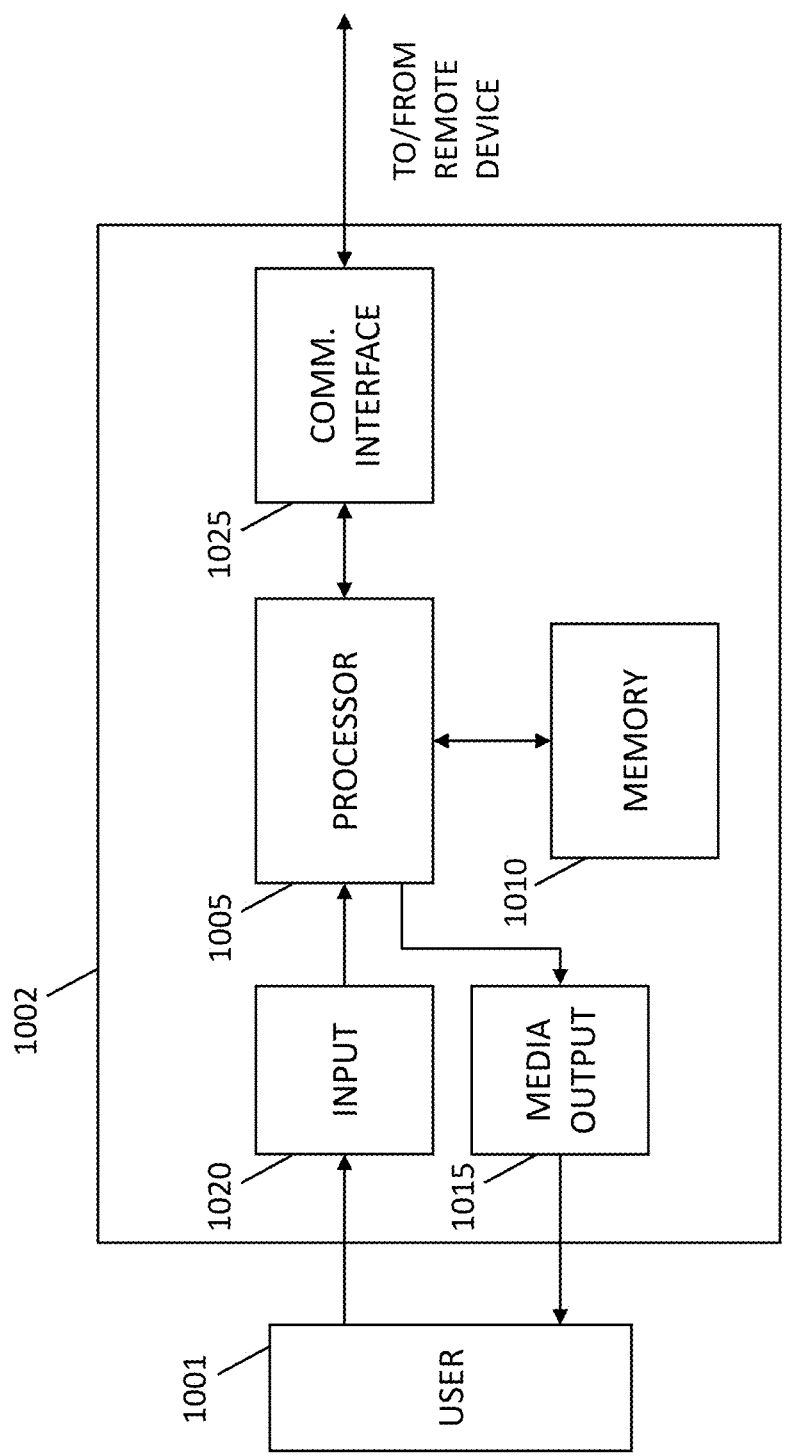
FIG. 10 depicts a schematic view of an exemplary user computing device that may be used in the system shown in FIG. 3.

FIG. 10 depicts a schematic view of an exemplary user computing device 1002. User computing device 1002 may be configured to implement a software application in embodiments of the method described above with respect to FIGS. 1 and 2 to communicate user input to a home cost analysis server (e.g., home cost analysis server 302, shown in FIG. 3) and receive output therefrom for display at the user computing device 1002. In one embodiment, user computing device 1002 may be any device capable of interconnecting to the Internet including a mobile computing device or "mobile device," such as a smartphone, a personal digital assistant (PDA), a tablet, a wearable device (e.g., a "smart watch" or a personal projection device such as "smart glasses"), smart contact lenses, a "phablet," or other web-connectable equipment or mobile devices. In some embodiments, user computing device 1002 may be a non-mobile device, such as a desktop computer device.

User computing device 1002 may include a processor 1005 for executing instructions. Instructions may be stored in a memory area 1010, for example. Processor 1005 may include one or more processing units (e.g., in a multi-core configuration). Memory 1010 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

In some embodiments, processor 1005 may be operatively coupled to a media output device 1015, also referred to as a display device 1015. Display device 1015 may be any component capable of conveying information to a user 1001. In some embodiments, display device 1015 may include an output adapter such as a video adapter and/or an audio adapter operatively coupled to processor 1005. Display device 1015 may include, for example, a liquid crystal display (LCD), organic light emitting diode (OLED) display, cathode ray tube (CRT), or "electronic ink" display and/or an audio output device (e.g., a speaker or headphones). In some embodiments, display device 1015 may be configured to present the software application ("app") or web browser through which the home cost analysis platform is accessed, in embodiments of the method described above with respect to FIGS. 1-9.

In some embodiments, processor 1005 may be operatively coupled to an input device 1020 configured to receive user input from user 1001. Input device 1020 may include, for example, a touch sensitive panel (e.g., a touch pad or a touch screen), a keyboard, a pointing device, a mouse, a stylus, a camera, a gyroscope, an accelerometer, a position detector, and/or an audio input device. It should be understood that in some embodiments, a single component such as a touch screen may function as both display device 1015 and input device 1020. In one example embodiment, the user application may accept "screen tap", "drop and drag", text entry, and/or any other input from user 1001 via input device 1020.

Figure 11:
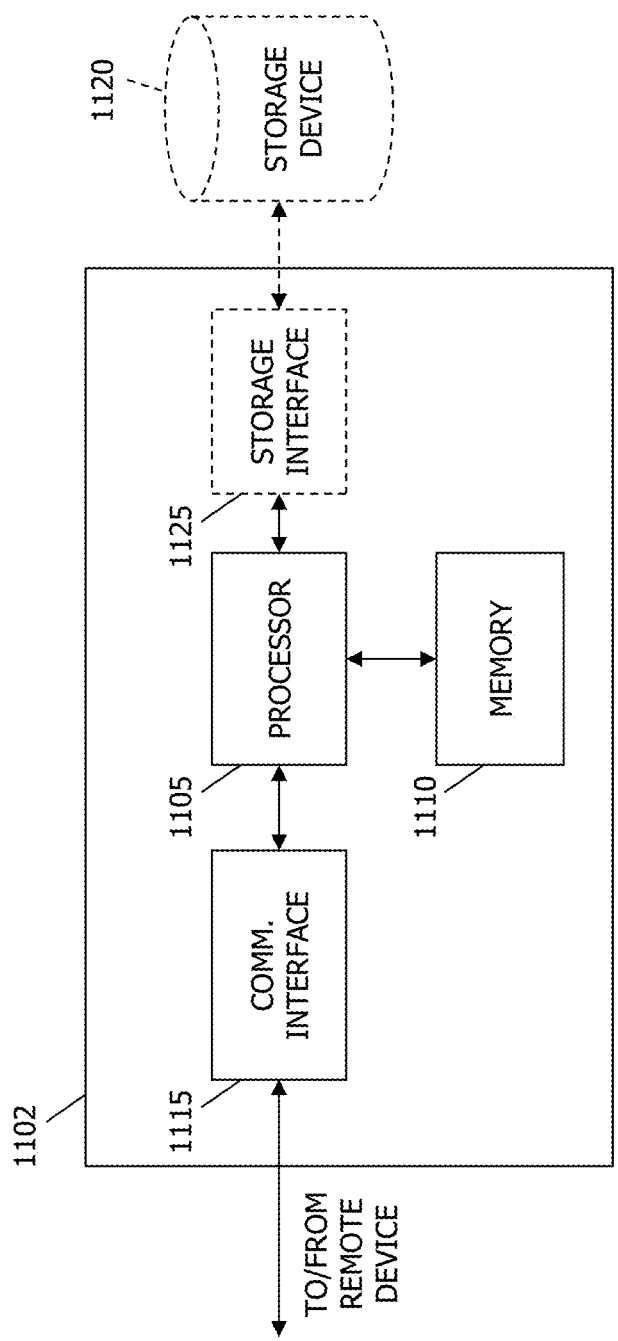
FIG. 11 depicts an exemplary configuration of a server computing device that may be used in the system shown in FIG. 3.

Processor 1005 may be operatively coupled to a communication interface 1025 such that user computing device 1002 may be capable of communicating with a remote device, such as a server computer device 1102 (shown in FIG. 11). For example, communication interface 1025 may communicate with the server device 1102 via a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Exemplary Server

FIG. 11 depicts an exemplary configuration of a server computing device 1102. Server computing device 1102 may include, for example, home cost analysis server 302, shown in FIG. 3. Additionally or alternatively, server computing device 1102 may include database server 310 (also shown in FIG. 3).

Server computing device 1102 may include a processor 1105 for executing instructions. Instructions may be stored in a memory area 1110, for example. Processor 1105 may include one or more processing units (e.g., in a multi-core configuration). Memory 1110 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Processor 1105 may be operatively coupled to a communication interface 1115 such that server computing device 1102 may be capable of communicating with a remote device, such as a user computing device 1002 (shown in FIG. 10). For example, communication interface 1115 may receive user input from the remote device via the Internet.

Processor 1105 may also be operatively coupled to at least one storage device 1120. Each storage device 1120 may be any computer-operated hardware suitable for storing and/or retrieving data. In some embodiments, at least one storage device 1120 may be integrated in server computing device 1102. For example, server computing device 1102 may include one or more hard disk drives as storage device 1120.

In other embodiments, at least one storage device 1120 may be external to server computing device 1102 and may be accessed by a plurality of server computing devices 1102. For example, storage device 1120 may include multiple storage units, such as hard disks or solid state disks in a redundant array of inexpensive disks (RAID) configuration. Storage device 1120 may include a storage area network (SAN) and/or a network attached storage (NAS) system.

In some embodiments, processor 1105 may be operatively coupled to the at least one storage device 1120 via at least one storage interface 1125. Storage interface 1125 may be any component capable of providing processor 705 with access to storage device 1120. Storage interface 1125 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1105 with access to storage device 1120.

Machine Learning and Other Matters

In certain embodiments, the home cost analysis server may store home cost data associated with one or more homes (available homes, selected homes, and/or unavailable home). The home cost analysis server may additionally or alternatively store images associated with homes for determining additional data associated with those homes.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, external database, and/or third-party data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, a processing element may be trained by providing it with a large sample of images and/or user data with known characteristics or features.

Based upon these analyses, the processing element may learn how to identify characteristics and patterns that may then be applied to analyzing home metadata, image data, and/or other data. For example, the processing element may learn, with the user's permission or affirmative consent, to identify the features or characteristics of homes from images thereof.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A home cost analysis server for identifying home costs, the home cost analysis server comprising a processor in communication with a memory, wherein the processor is programmed to:
   train an image processing program to identify features of homes from at least one image or other metadata associated with those homes, by inputting sample datasets of images and metadata of homes into the image processing program, to generate a machine-learned image processing program;
   receive user input from a user computing device associated with a prospective homebuyer, the user input including a prospective home;
   access a first external database storing metadata and images associated with homes available for purchase, the homes including the prospective home;
   input one or more images of the prospective home as inputs to the machine-learned image processing program, which outputs at least one feature of the prospective home depicted in the one or more images of the prospective home;
   access a second external database storing historical ancillary costs associated with homes in a geographic area in which the prospective home is located, wherein ancillary costs are based upon the geographic area and at least one feature of a respective home;
   perform a lookup in the second external database using an identifier representing the at least one outputted feature to retrieve comparable historical ancillary costs associated homes having a similar or comparable feature to the at least one outputted feature of the prospective home;
   analyze the metadata associated with the prospective home, the at least one outputted feature of the prospective home, and the comparable historical ancillary costs to determine one or more ancillary home costs associated with the prospective home; and
   display, at the user computing device, the one or more ancillary home costs and an anticipated overall monthly home cost for the prospective home.

2. The home cost analysis server of claim 1, wherein the metadata associated with the prospective home includes at least one of a listing price of the prospective home, an age of the prospective home, a building material of the prospective home, and the geographic area.

3. The home cost analysis server of claim 1, wherein the prospective home includes a first prospective home, and wherein the processor is further programmed to:
   receive user input of a second prospective home; access the first external database storing the metadata and images associated with the homes available for purchase, the homes further including the second prospective home;
   analyze metadata associated with the second prospective home and the historical ancillary costs to determine one or more ancillary home costs associated the second prospective home;
   generate a comparison of the one or more ancillary home costs associated with the first prospective home and the one or more ancillary home costs associated with the second prospective home; and
   display the comparison at the user computing device.

4. The home cost analysis server of claim 1, wherein the processor is further programmed to:
   access a third external database storing historical direct maintenance costs associated with a plurality of insured homes;
   analyze the metadata associated with the prospective home and the historical direct maintenance costs to determine one or more direct maintenance costs associated with the prospective home; and
   display the one or more direct maintenance costs at the user computing device including updating a graphical indicator relating the one or more ancillary home costs, the overall monthly home cost, and the one or more direct home maintenance costs for the prospective home.

5. The home cost analysis server of claim 4, wherein at least a portion of the direct maintenance costs are associated with insurance claims made on respective insured homes of the plurality of insured homes.

6. The home cost analysis server of claim 4, wherein the processor is further programmed to:
   determine an estimated future time associated with a first direct maintenance cost of the one or more direct maintenance costs based upon the analysis of the metadata associated with the prospective home and the historical direct maintenance costs; and
   display the estimated future time at the user computing device in association with display of the first direct maintenance cost.

7. The home cost analysis server of claim 1, wherein the processor is further configured to:
    access data associated with home purchases completed within the geographic area;
determine a purchase price trend of the home purchases within the geographic area;
    display a first monthly home cost for the prospective home for purchase of the prospective home at a listing price determined using the metadata associated with the prospective home; and
    display a second monthly home cost for the prospective home for purchase of the prospective home at a predicted price determined using the listing price and the purchase price trend.

8. A computer-implemented method for identifying home costs, the method implemented using a home cost analysis server including a processor in communication with a memory, the method comprising:
    training an image processing program to identify features of homes from at least one image or other metadata associated with those homes, by inputting sample datasets of images and metadata of homes into the image processing program, to generate a machine-learned image processing program;
    receiving user input from a user computing device associated with a prospective homebuyer, the user input including a prospective home;
    accessing a first external database storing metadata and images associated with homes available for purchase, the homes including the prospective home;
    inputting one or more images of the prospective home as inputs to the machine-learned image processing program, which outputs at least one feature of the prospective home depicted in the one or more images of the prospective home;
    accessing a second external database storing historical ancillary costs associated with homes in a geographic area in which the prospective home is located, wherein ancillary costs are based upon the geographic area and at least one feature of a respective home;
    performing a lookup in the second external database using an identifier representing the at least one outputted feature to retrieve comparable historical ancillary costs associated homes having a similar or comparable feature to the at least one outputted feature of the prospective home;
    analyzing the metadata associated with the prospective home, the at least one outputted feature of the prospective home, and the comparable historical ancillary costs to determine one or more ancillary home costs associated with the prospective home; and
    displaying, at the user computing device, the one or more ancillary home costs and an anticipated overall monthly home cost for the prospective home.

9. The computer-implemented method of claim 8, wherein the metadata associated with the prospective home includes at least one of a listing price of the prospective home, an age of the prospective home, a building material of the prospective home, and the geographic area.

10. The computer-implemented method of claim 8, wherein the prospective home includes a first prospective home, the method further comprising:
    receiving user input of a second prospective home;
    accessing the first external database storing the metadata and images associated with the homes available for purchase, the homes further including the second prospective home;
    analyzing metadata associated with the second prospective home and the historical ancillary costs to determine one or more ancillary home costs associated the second prospective home; generating a comparison of the one or more ancillary home costs associated with the first prospective home and the one or more ancillary home costs associated with the second prospective home; and
    displaying the comparison at the user computing device.

11. The computer-implemented method of claim 8, further comprising:
    accessing a third external database storing historical direct maintenance costs associated with a plurality of insured homes;
    analyzing the metadata associated with the prospective home and the historical direct maintenance costs to determine one or more direct maintenance costs associated with the prospective home; and
    displaying the one or more direct maintenance costs at the user computing device including updating a graphical indicator relating the one or more ancillary home costs, the overall monthly home cost, and the one or more direct home maintenance costs for the prospective home.

12. The computer-implemented method of claim 11, wherein at least a portion of the direct maintenance costs are associated with insurance claims made on respective insured homes of the plurality of insured homes.

13. The computer-implemented method of claim 11, further comprising:
    determining an estimated future time associated with a first direct maintenance cost of the one or more direct maintenance costs based upon the analysis of the metadata associated with the prospective home and the historical direct maintenance costs; and
    displaying the estimated future time at the user computing device in association with display of the first direct maintenance cost.

14. The computer-implemented method of claim 8, further comprising:
    accessing data associated with home purchases completed within the geographic area;
    determining a purchase price trend of the home purchases within the geographic area;
    causing to be displayed a first monthly home cost for the prospective home for purchase of the prospective home at a listing price determined using the metadata associated with the prospective home; and
    displaying a second monthly home cost for the prospective home for purchase of the prospective home at a predicted price determined using the listing price and the purchase price trend.

15. A non-transitory computer-readable storage medium having computer-executable instructions embodied thereon, wherein when executed by a home cost analysis server including a processor in communication with a memory, the computer-executable instructions cause the processor to:
    train an image processing program to identify features of homes from at least one image or other metadata associated with those homes, by inputting sample datasets of images and metadata of homes into the image processing program, to generate a machine-learned image processing program;
    receive user input from a user computing device associated with a prospective homebuyer, the user input including a prospective home;

access a first external database storing metadata and images associated with homes available for purchase, the homes including the prospective home;
input one or more images of the prospective home as inputs to the machine-learned image processing program, which outputs at least one feature of the prospective home depicted in the one or more images of the prospective home;
access a second external database storing historical ancillary costs associated with homes in a geographic area in which the prospective home is located, wherein ancillary costs are based upon the geographic area and at least one feature of a respective home;
perform a lookup in the second external database using an identifier representing the at least one outputted feature to retrieve comparable historical ancillary costs associated homes having a similar or comparable feature to the at least one outputted feature of the prospective home;
analyze the metadata associated with the prospective home, the at least one outputted feature of the prospective home, and the comparable historical ancillary costs to determine one or more ancillary home costs associated with the prospective home; and
display, at the user computing device, the one or more ancillary home costs and an anticipated overall monthly home cost for the prospective home.

16. The one non-transitory computer-readable storage medium of claim 15, wherein the metadata associated with the prospective home includes at least one of a listing price of the prospective home, an age of the prospective home, a building material of the prospective home, and the geographic area.

17. The one non-transitory computer-readable storage medium of claim 15, wherein the prospective home includes a first prospective home, and wherein the computer-executable instructions further cause the processor to:
receive user input of a second prospective home;
access the first external database storing the metadata and images associated with the homes available for purchase, the homes further including the second prospective home;
analyze metadata associated with the second prospective home and the historical ancillary costs to determine one or more ancillary home costs associated the second prospective home;
generate a comparison of the one or more ancillary home costs associated with the first prospective home and the one or more ancillary home costs associated with the second prospective home; and
display the comparison at the user computing device.

18. The one non-transitory computer-readable storage medium of claim 15, wherein the computer-executable instructions further cause the processor to:
access a third external database storing historical direct maintenance costs associated with a plurality of insured homes;
analyze the metadata associated with the prospective home and the historical direct maintenance costs to determine one or more direct maintenance costs associated with the prospective home; and
display the one or more direct maintenance costs at the user computing device including updating a graphical indicator relating the one or more ancillary home costs, the overall monthly home cost, and the one or more direct home maintenance costs for the prospective home.

19. The one non-transitory computer-readable storage medium of claim 18, wherein the computer-executable instructions further cause the processor to:
determine an estimated future time associated with a first direct maintenance cost of the one or more direct maintenance costs based upon the analysis of the metadata associated with the prospective home and the historical direct maintenance costs; and
display the estimated future time at the user computing device in association with display of the first direct maintenance cost.

20. The one non-transitory computer-readable storage medium of claim 15, wherein the computer-executable instructions further cause the processor to:
access data associated with home purchases completed within the geographic area;
determine a purchase price trend of the home purchases within the geographic area;
display a first monthly home cost for the prospective home for purchase of the prospective home at a listing price determined using the metadata associated with the prospective home; and
display a second monthly home cost for the prospective home for purchase of the prospective home at a predicted price determined using the listing price and the purchase price trend.

* * * * *